United States Patent Office 3,133,927
Patented May 19, 1964

3,133,927
PREPARATION OF 18A-HYDROXY-YOHIMBANES
Michael Mullen Robison, Berkeley Heights, and Robert Armistead Lucas, Mendham, N.J., assignors to Ciba Corporation, a corporation of Delaware
No Drawing. Filed Aug. 2, 1960, Ser. No. 46,884
2 Claims. (Cl. 260—287)

The present invention concerns 3-epi-allo-yohimbane compounds having the nucleus of the formula:

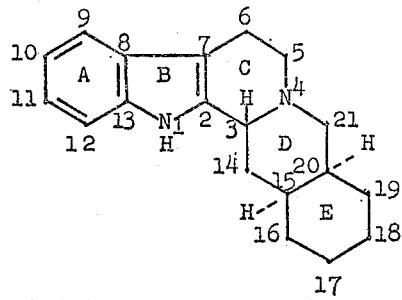

More particularly, it relates to 18α-hydroxy-17α-lower alkoxy-3-epi-allo-yohimbane 16β-carboxylic acid esters, salts, N-oxides or salts of N-oxides thereof. Apart from already mentioned groups, the compounds may contain additional substituents; such substituents are, for example, aliphatic hydrocarbon, e.g. lower alkyl and the like, etherified hydroxyl, e.g. lower alkoxy, cycloalkyloxy, cycloalkyl-lower alkoxy, carbocyclic aryloxy, carbocyclic aryl-lower alkoxy, lower alkylenedioxy and the like, esterified hydroxyl, e.g. lower alkoxy-carbonyloxy, lower alkanoyloxy, halogeno and the like, etherified mercapto, e.g. lower alkylmercapto and the like, nitro, amino, e.g. N,N-disubstituted amino and the like, halogeno-lower alkyl or any other suitable substituent. These substituents are preferably attached to positions available for substitution in the aromatic carbocyclic nucleus (or ring A) of the molecule, i.e. the 9-position, the 10-position, the 11-position and/or the 12-position; substituents, particularly aliphatic hydrocarbon radicals, e.g. lower alkyl and the like, may also be attached to positions in other nuclei, particularly to the 5-position or the 6-position available for substitution in the heterocyclic ring C.

More especially, the invention is directed to compounds of the formula:

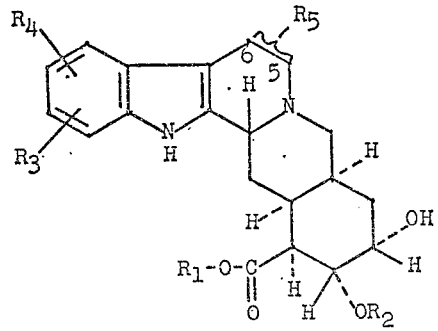

in which $R_1$ represents primarily lower alkyl, as well as substituted lower alkyl, such as, for example, monocyclic carbocylic aryl-lower alkyl, e.g. phenyl-lower alkyl and the like, etherified hydroxy-lower alkyl, e.g. lower alkoxy-lower alkyl and the like, $R_2$ stands for lower alkyl, each of the radicals $R_3$ and $R_4$ stands for hydrogen, lower aliphatic hydrocarbon, particularly lower alkyl, etherified hydroxyl, particularly lower alkoxy, as well as cyclolkyloxy, cycloalkyl-lower alkoxy, carbocyclic aryloxy, carbocyclic aryl-lower alkoxy or any other analogous etherified hydroxy group, esterified hydroxyl, particularly halogeno, as well as lower alkoxy-carbonyloxy, lower alkanoyloxy and the like, etherified mercapto, particularly lower alkylmercapto, nitro, amino, e.g. N,N-di-substituted amino and the like, halogeno-lower alkyl, or, whenever attached to adjacent positions and taken together, for lower alkylenedioxy, and $R_5$, attached to one of the positions 5 and 6, stands for hydrogen or lower alkyl, salts, N-oxides or salts of N-oxides of such compounds, as well as process for the preparation of such compounds.

The radical of the alcohol portion of the ester grouping attached to the 16-position of the molecule, which in the above formula is represented by the group $R_1$, stands above all for lower alkyl containing from one to seven, preferably from one to four, carbon atoms; such groups are particularly methyl, ethyl, n-propyl, isopropyl, n-butyl, isobutyl, as well as n-pentyl, isopentyl, n-hexyl, n-heptyl and the like.

The esterifying group of the ester grouping attached to the 16-position of the molecule, represented, for example, by the radical $R_1$ in the above formula, may also stand for substituted lower alkyl, such as, for example, monocyclic carbocyclic aryl-lower alkyl, in which lower alkyl contains from one to four carbon atoms, such as phenyl-lower alkyl, e.g. benzyl, 1-phenylethyl, 2-phenylethyl and the like, or phenyl-lower alkyl, in which phenyl is substituted by lower alkyl, e.g. methyl, ethyl and the like, lower alkoxy, e.g. methoxy, ethoxy and the like, halogeno, e.g. fluoro, chloro, bromo and the like, or any other suitable substituent.

Other substituted lower alkyl radicals, represented by the group $R_1$ in the above formula, are, for example, lower alkyl radicals substituted by functional groups, such as etherified hydroxyl, particularly lower alkoxy containing preferably from one to four carbon atoms, e.g. methoxy, ethoxy, n-propyloxy, isobutyloxy and the like, or any other suitable functional group, such as tertiary amino, particularly N,N-di-lower alkyl-amino, e.g. N,N-dimethylamino, N,N-diethylamino and the like. The lower alkyl portion of a lower alkyl radical substituted by a functional group may be a lower alkylene radical, which contains from two to four carbon atoms, and separates the substituent from the carbon atom of the carboxy group by at least two carbon atoms. Preferably, such lower alkylene radical contains from two to three carbon atoms and separates the substituent, such as the etherified hydroxyl group and the like, from the carboxy group by the same number of carbon aotms. The alkylene radicals are primarily 1,2-ethylene, 1-methyl-1,2-ethylene, 2-methyl-1,2-ethylene, 1,3-propylene, 1,4-butylene and the like. Lower alkyl radicals containing a functional group, which radicals are represented by $R_1$ in the above formula, are, for example, 2-lower alkyl-ethyl, e.g. 2-methoxyethyl, 2-ethoxyethyl and the like, 2-lower alkoxypropyl, e.g. 2-methoxypropyl and the like, 3-lower alkoxypropyl, e.g. 3-methoxypropyl, 3-ethoxypropyl and the like, or any other suitable lower alkyl radical containing a functional group.

The lower alkyl portion of the lower alkoxy substituent attached to the carbon atoms representing the 17-position in the molecule, is the $R_2$ radical in the above-given formula; it contains preferably from one to four carbon atoms, and stands for ethyl, n-propyl, isopropyl, n-butyl, isobutyl and the like, but represents, above all, methyl.

Substituents attached to any of the positions available for substitution in ring A, particularly those represented by the groups $R_3$ and $R_4$ (each of which may also stand for hydrogen) in the previously given formula, may be, for example, lower aliphatic hydrocarbon, especially lower alkyl, containing preferably from one to four carbon atoms, e.g. methyl, ethyl, p-propyl, isopropyl, n-butyl and the like, or functional groups, such as, for example, etherified hydroxyl, particularly lower alkoxy, containing preferably from one to four carbon atoms, e.g. methoxy, ethoxy, n-propyloxy, isopropyloxy, n-butyloxy, isobutyloxy and the like, as well as cycloalkyloxy, in which cycloalkyl contains from three to eight, preferably from five to six, ring carbon atoms, e.g. cyclopentyloxy, cyclohexyloxy and the like, cycloalkyl-lower alkoxy, in which cycloalkyl contains from three to eight, preferably from five to six, ring carbon atoms, e.g. cyclopentylmethoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenylmethoxy, 2-phenylethoxy and the like, esterified hydroxyl, particularly lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkyl-mercapto, containing preferably from one to four carbon atoms, e.g. methylmercapto, ethylmercapto and the like, nitro, amino, particularly N,N-disubstituted amino, such as N,N-di-lower alkyl-amino, e.g. N,N-dimethylamino, N-ethyl-N-methyl-amino, N,N-diethylamino and the like, halogeno, e.g. fluoro, chloro, bromo, iodo and the like, halogeno-lower alkyl, e.g. trifluoromethyl and the like, or any other suitable functional group. A substituent may also be attached to two adjacent positions of ring A and form a fused-on ring; for example, the radicals $R_4$ and $R_5$ in the formula, when substituting two neighboring positions and taken together, may also form a fused-on cyclic substituent. Such substituents may be represented, for example, by lower alkylene-dioxy, e.g. methylenedioxy, 1,1-ethylenedioxy and the like, or any other analogous grouping.

Substituents, which may be attached to other positions in the molecule, particularly to positions in ring C, which are available for substitution, are primarily aliphatic hydrocarbon, such as lower alkyl, containing preferably from one to four carbon atoms, particularly methyl, as well as ethyl, n-propyl, isopropyl and the like. The radical $R_5$ in the previously given formula, which stands primarily for hydrogen, may, therefore, also represent lower alkyl, particularly methyl, as well as ethyl and the like.

Salts of the compounds of this invention are primarily acid addition salts, particularly those with inorganic acids, such as mineral acids, e.g. hydrochloric, hydrobromic, sulfuric, phosphoric acids and the like, as well as with organic acids, e.g. acetic, tartaric, methane sulfonic acid and the like.

Also included within the scope of the present invention are the N-oxides of the above-mentioned compounds, as well as acid addition salts of these N-oxides, such as the addition salts with the above-mentioned inorganic, particularly mineral, and organic acids.

In view of the fact that several asymmetric carbon atoms are present in the compounds of this invention, the latter may be obtained in the form of a mixture of racemates, racemates or optically pure compounds.

The compounds of the present invention are valuable intermediates for the preparation of pharmacologically active compounds. For example, upon acylation of the 18α-hydroxyl group according to procedures to be described hereinbelow, the compounds of this invention may be converted into 18α-acyloxy-17α-lower alkoxy-3-epi-allo-yohimbane 16β-carboxylic acid esters, particularly into compounds of the formula:

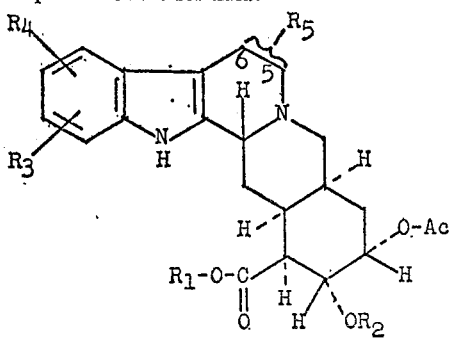

in which $R_1$, $R_2$, $R_3$, $R_4$ and $R_5$ have the previously given meaning, and Ac represents the acyl radical of an organic carboxylic or of an organic sulfonic acid, salts, N-oxides or salts of N-oxides thereof. It is known that alterations of the stereoconfiguration of naturally occurring and pharmacologically active Rauwolfia alkaloids, such as reserpine and the like, lead to compounds without any pharmacological effects; for example, isomerization of the hydrogen attached to the 3-position in such alkaloids, e.g. isomerization of reserpine to 3-iso-reserpine, is accompanied with a loss of the antihypertensive and sedative properties. Contrary thereto, the above-described 18α-acyloxy-17α-lower alkoxy-3-epi-allo-yohimbane 16β-carboxylic acid esters, such as the compounds of the above formula, which include, for example, 18-epi-reserpine and the like, have sedative and tranquilizing effects on the central nervous system, as well as antihypertensive properties. These compounds can, therefore, be used as sedative and tranquilizing agents to relieve states of hyperactivity, tension and agitation, as, for example, associated with mental disturbances, anxiety and the like. Furthermore, they can be used as antihypertensive agents to relieve hypertensive conditions, such as, for example, benign or malignant hypertension, renal hypertension or hypertension associated with pregnancy, such as toxemia of pregnancy.

In addition, 18α-acyloxy-17α-lower alkoxy-3-epi-allo-yohimbane 16β-carboxylic acid esters of the previously given type may also serve as intermediates.

In the above diesters, the acyl radical of the acyloxy group is represented by the acyl radical of an organic carboxylic or an organic sulfonic acid, which acids will be shown in detail hereinbelow. The diesters may be prepared according to methods used for the preparation of esters; for example, they may be obtained by treatment with a reactive functional derivative of an acid, such as a halide, particularly the chloride, or the anhydride, thereof, in the presence of an appropriate reagent, such as a base, for example, pyridine and the like. Details of the esterification reaction will be given hereinbelow.

The 18α-hydroxy-17α-lower alkoxy-3-epi-allo yohimbane 16β-carboxylic acid esters as described hereinbefore may also serve as starting materials for the preparation of 18α - etherified hydroxy - 17α - lower alkoxy-3-epi-allo-yohimbane 16β-carboxylic acids, salts, N-oxides of salts of N-oxides thereof, particularly of compounds of the formula:

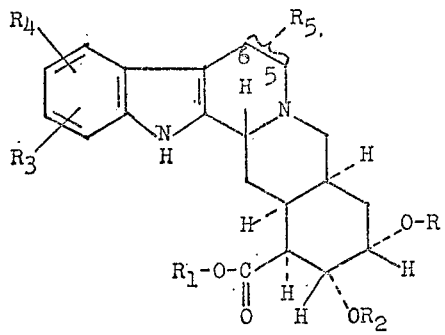

in which $R_1$, $R_2$, $R_3$, $R_4$ and $R_5$ have the previously given meaning, and R represents aliphatic hydrocarbon, such as lower alkyl, especially methyl, and the like, or substituted aliphatic hydrocarbon, such as substituted lower alkyl, salts, N-oxides or salts of N-oxides thereof. The above-described compounds have sedative and tranquilizing effects, as well as antihypertensive properties and may be used accordingly. They may be prepared, for example, by etherification with an aliphatic diazo-hydrocarbon, such as a lower diazo-alkane, especially diazomethane and the like, or with a substituted aliphatic diazo-hydrocarbon, such as a substituted lower diazo-alkane and the like, in the presence of an inorganic Lewis acid, particularly fluoboric acid, in an appropriate diluent.

Finally, the 18α-hydroxy-17α-lower alkoxy-3-epi-allo-yohimbane 16β-carboxylic acid esters, the salts, the N-oxides and the salts of the N-oxides thereof may be useful in the preparation of 18α-hydroxy-17α-lower alkoxy-3-epi-allo-yohimbane 16β-carboxylic acids, particularly of acids of the formula:

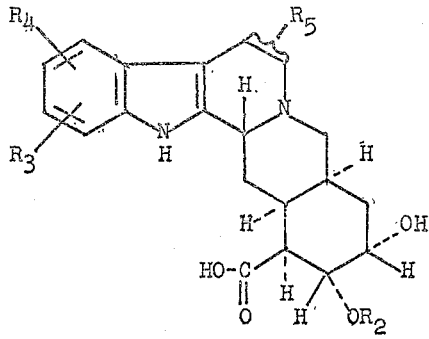

in which $R_2$, $R_3$, $R_4$ and $R_5$ have the previously given meaning, salts, N-oxides or salts of N-oxides thereof. These acids may be used, for example, for the preparation of 18α-hydroxy-17α-lower alkoxy-3-epi-allo-yohimbane 16β-carboxylic acid esters, in which the 16β-carboxylic acid ester grouping is different from the carboxylic acid ester group in the 18α-hydroxy-17α-lower alkoxy-3-epi-allo-yohimbane 16β-carboxylic acid esters used for the preparation of the above acid; the resulting monoesters can then be converted into pharmacologically active diesters, for example, according to the procedure to be described hereinbelow, or into the pharmacologically active 18α-etherified hydroxy-17α-lower alkoxy-3-epi-allo-yohimbane 16β-carboxylic acid esters according to the previously shown procedure. The hydrolysis of the 18α-hydroxy-17α-lower alkoxy-3-epi-allo-yohimbane 16β-carboxylic acid esters of this invention into the free acids will be described hereinbelow; the 18α-hydroxy-17α-lower alkoxy-3-epi-allo-yohimbane 16β-carboxylic acids, the salts, the N-oxides and the salts of N-oxides thereof are new and are intended to be included within the scope of this invention.

Particularly useful as intermediates are the compounds of the formula:

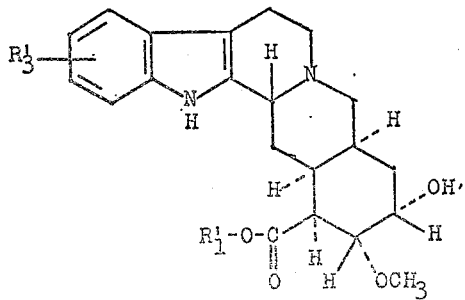

in which $R_1'$ represents lower alkyl, containing preferably from one to four carbon atoms, especially methyl, as well as ethyl, n-propyl, isopropyl, n-butyl, isobutyl, secondary butyl and the like, and $R_4'$ represents lower alkoxy, containing from one to four carbon atoms, particularly methoxy, as well as ethoxy, n-propyloxy, isopropyloxy, n-butyloxy and the like, whereby $R_4'$ is preferably attached to the 10-position or the 11-position, said addition salts, N-oxides or acid addition salts of N-oxides thereof.

These compounds are represented by lower alkyl 18-epi-reserpates, in which lower alkyl contains from one to four carbon atoms, and represents primarily methyl, as well as ethyl, n-propyl, isopropyl, n-butyl, isobutyl and the like, acid addition salts, N-oxides or acid addition salts of N-oxides thereof. The methyl 18-epi-reserpate of the formula:

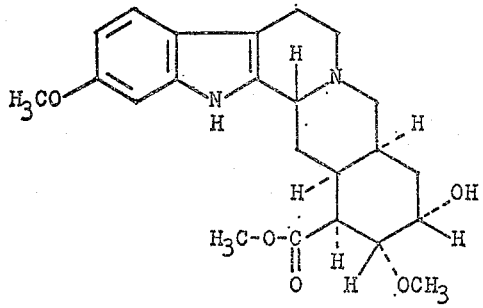

or acid addition salts thereof, represent very useful members of this group of intermediates. Other members are, for example, ethyl 18-epi-reserpate, n-propyl 18-epi-reserpate, isopropyl 18-epi-reserpate, n-butyl 18-epi-reserpate, isobutyl 18-epi-reserpate and the like.

Other compounds of the aforementioned formula are, for example, lower alkyl 9-methoxy-18-epi-deserpidates, e.g. methyl 9-methoxy-18-epi-deserpidate, ethyl 9-methoxy-18-epi-deserpidate, n-propyl 9-methoxy-18 - epi-deserpidate and the like, lower alkyl 10-methoxy-18-epi-deserpidates, e.g. methyl 10-methoxy-18-epi-deserpidate, ethyl 10-methoxy-18-epi-deserpidate, n-propyl 10 - methoxy-18-epi-deserpidate, isopropyl 10-methoxy-18-epi-deserpidate and the like, lower alkyl 11-ethoxy-18-epi-deserpidates, e.g. methyl 11 - ethoxy-18-epi-deserpidate, ethyl 11-ethoxy-18-epi-deserpidate and the like, lower alkyl 11-n-propyloxy-18-epi-deserpidates, e.g., methyl 11-n-propyloxy-18-epi-deserpidate, ethyl 11-n-propyloxy-18-epi-deserpidate and the like, lower alkyl 11-isopropyloxy-18-epi-deserpidates, e.g. methyl 11-isopropyloxy-18-epi-deserpidate, ethyl 11-isopropyloxy-18-epi-deserpidate and the like, lower alkyl 11-n-butyloxy-18-epi-deserpidates, e.g. methyl 11-n-butyloxy-18-epi-deserpidate, ethyl 11-n-butyloxy-18- epi-deserpidate and the like, lower alkyl 12-methoxy-18-epi-deserpidates, e.g. methyl 12-methoxy-18-epi-deserpidate, ethyl 12-methoxy-18-epi-deserpidate and the like, or acid addition salts thereof.

An additional preferred group of compounds are the lower alkyl 18-epi-deserpidates, in which lower alkyl contains preferably from one to four carbon atoms, and is represented primarily by methyl, as well as ethyl, n-propyl, isopropyl, n-butyl, isobutyl and the like, acid addition salts, N-oxides and acid addition salts of N-oxides thereof. Specific members of this group are particularly methyl 18-epi-deserpidate, as well as ethyl 18-epi-deserpidate, n-propyl 18-epi-O-methyl-deserpidate, isopropyl 18-epi-deserpidate, n-butyl 18-epi-deserpidate, secondary butyl 18-epi-deserpidate, n-pentyl 18-epi-deserpidate and the like, or acid addition salts thereof.

Other valuable intermediates are, for example, lower alkyl 5-methyl-18-epi-reserpates, e.g. methyl 5-methyl-18-epi-reserpate, ethyl 5-methyl-18-epi-reserpate and the like, lower alkyl 6-methyl-18-epi-reserpates, e.g. methyl 6-methyl-18-epi-reserpate, ethyl 6-methyl-18-epi-reserpate and the like,
lower alkyl 6-methyl-18-epi-deserpidates, e.g.
methyl 6-methyl-18-epi-deserpidate,
ethyl 6-methyl-18-epi-deserpidate and the like,
lower alkyl 9-methyl-18-epi-deserpidates, e.g.
methyl 9-methyl-18-epi-deserpidate,
n-propyl 9-methyl-18-epi-deserpidate and the like,
lower alkyl 11-methyl-18-epi-deserpidates, e.g.
methyl 11-methyl-18-epi-deserpidate,
ethyl 11-methyl-18-epi-deserpidate and the like,
lower alkyl 10-methoxy-18-epi-reserpate, e.g.
methyl 10-methoxy-18-epi-reserpate,
ethyl 10-methoxy-18-epi-reserpate and the like,
lower alkyl 9,10-dimethoxy-18-epi-reserpates, e.g.
methyl 9,10-dimethoxy-18-epi-reserpate,
ethyl 9,10-dimethoxy-18-epi-reserpate and the like, lower alkyl 10,11-lower alkylenedioxy-18-epi-deserpidates, e.g.
methyl 10,11-methylenedioxy-18-epi-deserpidate,
ethyl 10,11-methylenedioxy-18-epi-deserpidate and the like,
lower alkyl 10-benzoyloxy-18-epi-deserpidates, e.g.
methyl 10-benzyloxy-18-epi-deserpidate,
ethyl 10-benzyloxy-18-epi-deserpidate and the like,
lower alkyl 11-benzyloxy-18-epi-deserpidates, e.g.
methyl 11-benzyloxy-18-epi-deserpidate,
ethyl 11-benzyloxy-18-epi-deserpidate and the like,
lower alkyl 11-methylmercapto-18-epi-deserpidates, e.g.
methyl 11-methylmercapto-18-epi-deserpidate,
ethyl 11-methylmercapto-18-epi-deserpidate and the like,
lower alkyl 11-ethyl-mercapto-18-epi-deserpidates, e.g.
methyl 11-ethylmercapto-18-epi-deserpidate,
ethyl 11-ethylmercapto-18-epi-deserpidate,
n-propyl 11-ethylmercapto-18-epi-deserpidate and the like,
lower alkyl 10-chloro-18-epi-deserpidates, e.g.
methyl 10-chloro-18-epi-deserpidate,
ethyl 10-chloro-18-epi-deserpidate and the like,
lower alkyl 10-bromo-18-epi-reserpates, e.g.
methyl 10-bromo-18-epi-reserpate,
ethyl 10-bromo-18-epi-reserpate and the like,
lower alkyl 17α-desmethoxy-17α-ethoxy-18-epi-reserpates, e.g.
methyl 17α-desmethoxy-17α-ethoxy-18-epi-reserpate,
ethyl 17α-desmethoxy-17α-ethoxy-18-epi-reserpate and the like,
lower alkyl 17α-desmethoxy-17α-n-propyloxy-18-epi-reserpates, e.g.
methyl 17α-desmethoxy-17α-n-propyloxy-18-epi-reserpate,
ethyl 17α-desmethoxy-17α-n-propyloxy-18-epi-reserpate and the like,
lower alkyl 17α-desmethoxy-17α-isopropyloxy-18-epi-reserpate, e.g.
methyl 17α-desmethoxy-17α-isopropyloxy-18-epi-reserpate,
ethyl 17α-desmethoxy-17α-isopropyloxy-18-epi-reserpate and the like,
lower alkyl 17α-desmethoxy-17α-ethoxy-18-epi-deserpidates, e.g.
methyl 17α-desmethoxy-17α-ethoxy-18-epi-deserpidate,
ethyl 17α-desmethoxy-17α-ethoxy-18-epi-deserpidate and the like,
or analogous compounds, and acid addition salts thereof.

Also included in the scope of the invention are, for example, lower alkoxy-lower alkyl 18-epi-reserpates and lower alkoxy-lower alkyl 18-epi-deserpidates, or acid addition salts thereof. Lower alkyl of the lower alkoxy-lower alkyl portion represents a lower alkylene radical, which contains from two to three carbon atoms and separates the lower alkoxy group from the carbon atom of the carboxyl group by the same number of carbon atoms, and the lower alkoxy has from one to four carbon atoms, and the lower alkyl group attached to the oxygen atom of the 18-position contains from one to four carbon atoms; lower alkoxy-lower alkyl represents, for example, 2-methoxyethyl, 2-ethoxyethyl, 2-methoxypropyl, 3-methoxyethyl, and the like, and lower alkyl may stand for methyl, ethyl, n-propyl, isopropyl, n-butyl or isobutyl and the like. Specific compounds of this group are, for example, 2-methoxyethyl 18-epi-reserpate, 2-ethoxyethyl 18-epi-reserpate, 2-methoxypropyl 18-epi-reserpate, 3-methoxypropyl 18-epi-reserpate, 2-methoxyethyl 18-epi-deserpidate, 2-ethoxyethyl 18-epi-deserpidate and the like, or acid addition salts thereof.

The 18α-hydroxy-17α-lower alkoxy-3-epi-allo-yohimbane 16β-carboxylic acid esters, particularly those of the previously given formula, salts, N-oxides or salts of N-oxides thereof may be prepared, for example, by reacting an 18β-carbocyclic arylsulfonyloxy-17α-lower alkoxy-3-epi-allo-yohimbane 16β-carboxylic acid ester, a salt, an N-oxide or a salt of an N-oxide thereof, with water in the presence of an organic tertiary amine and, if desired, converting a resulting salt into the free base, and/or, if desired, converting a resulting compound into a salt, an N-oxide or a salt of an N-oxide thereof, and/or, if desired, converting a resulting mixture of isomers into the single isomers.

A salt of the starting material or of an N-oxide thereof, is an addition salt with an acid, primarily a salt with an inorganic, such as a mineral, acid, e.g. hydrochloric, hydrobromic, sulfuric, phosphoric acid and the like.

Carbocyclic aryl stands preferably for monocyclic carbocyclic aryl, which may be represented by phenyl, or, more particularly, by substituted phenyl. The latter is preferably a phenyl radical substituted in the 4-position, as well as in the 2-position and/or the 6-position by an electron-withdrawing substituent, such as, for example, halogeno, e.g. fluoro, chloro, or primarily bromo, as well as iodo, or nitro, as well as, for example, functionally converted carboxyl, such as carbo-lower alkoxy, e.g. carbomethoxy, carbethoxy and the like, carbamyl, cyano and the like, or any other suitable electron-withdrawing group. Lower alkyl, especially methyl and the like, may also represent a suitable group. Carbocyclic aryl may, therefore, be represented by phenyl, or primarily by 4-halogeno-phenyl, e.g. 4-bromo-phenyl and the like, 4-nitrophenyl, 4-cyano-phenyl as well as the corresponding 2-substituted, 2,4-di-substituted, 2,4,6-tri-substituted phenyl radicals and the like.

Hydrolysis with water is carried out in the presence of an organic tertiary amine, particularly an aliphatic tertiary amine, such as an N,N,N-tri-lower alkyl-amine, e.g. N,N,N-tri-methylamine, N-ethyl-N,N-dimethylamine, N,N-diethyl-N-methylamine, N,N,N-triethylamine and the like, an N,N,N',N'-tetra-lower alkyl-lower alkylene-diamine, e.g. N,N,N',N'-tetramethyl-1,5-pentylenediamine, N,N,N',N'-tetramethyl-1,6-hexylenediamine, N,N,N',N'-tetraethyl-1,6-hexylenediamine, N,N,N',N'-tetramethyl-1,7-heptylenediamine and the like, or any other suitable aliphatic tertiary amine. Other tertiary amines may also be heterocyclic tertiary bases, e.g. pyridine, collodine and the like, or any other suitable organic tertiary amine.

The hydrolysis may be carried out in the absence or presence of an additional solvent; suitable inert diluents are, for example, p-dioxane and the like. The reaction is preferably completed at an elevated temperature, if necessary, under increased pressure and/or in the atmosphere of an inert gas, such as nitrogen.

The above procedure may be illustrated by the hydrolysis of methyl 18-O-(carbocyclic aryl-sulfonyl)-reserpate, in which carbocyclic aryl represents phenyl, 4-halogeno-phenyl, e.g. 4-bromophenyl and the like, 4-nitrophenyl, 4-cyanophenyl or any other suitable 4-substituted phenyl radical, with water in the presence of an organic tertiary amine, particularly an N,N,N-tri-lower alkyl-amine, e.g. N,N,N-triethylamine and the like, to form the desired methyl 18-epi-reserpate.

The 18β-carbocyclic aryl-sulfonyloxy-17α-lower alkoxy-3-epi-allo-yohimbane 16β-carboxylic acid esters, salts, N-oxides or salts of N-oxides thereof, which compounds are used as the starting materials in the above procedure, may be prepared by reacting an 18β-hydroxy-17α-lower alkoxy-3-epi-allo-yohimbane 16β-carboxylic acid ester, a salt, an N-oxide or a salt of an N-oxide thereof with a carbocyclic aryl sulfonic acid halide, particularly a chloride, as well as a fluoride, bromide and the like, in the presence of an organic base, and, if desired, carrying out optional steps.

A carbocyclic aryl sulfonic acid halide is primarily a monocyclic carbocyclic aryl sulfonic acid chloride, in which carbocyclic aryl represents primarily phenyl, or substituted phenyl. Substituents of the phenyl portion are attached to the 4-position, the 2-position and/or the 6-position, and are represented primarily by electron-withdrawing groups, such as, for example, halogeno, e.g. bromo and the like, nitro, carbo-lower alkoxy, carbamyl, cyano and the like; lower alkyl may also be a suitable substituent.

An organic base may be, for example, a heterocyclic tertiary amine, particularly pyridine, as well as collidine and the like, or any other suitable organic base, such as one of those previously mentioned.

If necessary, the esterification reaction is carried out while cooling, in the absence of moisture, and/or in the presence of an additional inert diluent.

The 18α-hydroxy-17α-lower alkoxy-3-epi-allo-yohimbane 16β-carboxylic acid esters, salts, N-oxides or salts of N-oxides thereof may also be prepared, for example, by esterifying in an 18α-hydroxy-17α-lower alkoxy-3-epi-allo-yohimbane 16β-carboxylic acid, a salt, an N-oxide or a salt of an N-oxide thereof, the free carboxyl group in the 16β-position, and, if desired, carrying out the optional steps.

The free carboxyl group in the 16β-position may be esterified according to known methods; for example, the starting material, preferably a solution thereof, may be treated with a diazo-reagent, such as, for example, a lower diazo-alkane, e.g. diazomethane, diazoethane, n-diazopropane, diazo-isopropane, n-diazobutane, diazo-isobutane and the like, or a substituted lower diazo-alkane, for example, an etherified hydroxy-lower diazo-alkane, such as a lower alkoxy-lower diazo-alkane, in which lower alkoxy is separated from the diazo group by at least two, preferably by from two to three carbon atoms, e.g. 2-methoxy-diazoethane, 2-ethoxy-diazoethane, 2-n-propyloxy-diazoethane, 3-methoxy-diazopropane and the like, a tertiary amino-lower diazoalkane, particularly an N,N-di-lower alkyl amino-lower diazoalkane, in which the N,N-di-lower alkyl-amino group is separated from the diazo group by at least two, preferably by from two to three, carbon atoms, e.g. 2-N,N-dimethylamino-diazoethane, 2-N,N-diethylamino-diazoethane, 3-N,N-dimethylamino-diazopropane and the like, or any other suitable diazo-compound. The diazo reagents are advantageously used in solution with an inert diluent, such as, for example, an ether, e.g. diethylether and the like, or they may be distilled out of their solution into a solution of the starting material. An excess of the diazo-compound present after the completion of the reaction may be destroyed, for example, by adding an additional carboxylic acid, such as acetic, benzoic acid and the like.

The diazo-reagent may be given to the starting material or a solution thereof; suitable solvents are, for example, ethers, e.g. diethylether, tetrahydrofuran and the like, lower alkanols, e.g. methanol, ethanol and the like, halogenated hydrocarbons, e.g. chloroform, methylenechloride and the like, or any other appropriate solvents.

The above procedure may be illustrated by the treatment of 18-epi-reserpic acid with diazomethane to form the desired methyl 18-epi-deserpidate.

The 18α-hydroxy-17α-lower alkoxy-3-epi-allo-yohimbane 16β-carboxylic acids, which are used as the starting materials in the above-described procedure are new and are intended to be included within the scope of the invention; they may be prepared, for example, by hydrolyzing in an 18α-hydroxy-17α-lower alkoxy-3-epi-allo-yohimbane 16β-carboxylic acid ester, a salt, an N-oxide or a salt of an N-oxide thereof, the esterified carboxyl group attached to the 16β-position into a free carboxyl group, and, if desired, converting a resulting compound into a salt, an oxide or a salt of an N-oxide thereof.

Hydrolysis may be carried out according to known methods; for example, the esterified carboxyl group may be cleaved by treatment with an alkali metal hydroxide, e.g. sodium hydroxide, potassium hydroxide and the like, in a lower alkanol, e.g. methanol, ethanol and the like, or, preferably, in an aqueous solution of a lower alkanol.

The above-described procedure for the preparation of 18α-hydroxy-17α-lower alkoxy-3-epi-allo-yohimbane 16β-carboxylic acid esters, including the preparation of the starting material may be illustrated, for example, by the hydrolysis of ethyl 18-epi-reserpate furnishing the 18-epi-reserpic acid, which may then be esterified with a diazo-compound other than diazoethane, for example, diazomethane and the like, to form the desired 18-epi-reserpic acid ester, such as methyl 18-epi-reserpate and the like.

As previously mentioned, the starting materials used in the above modification of the procedure for the preparation of the compounds of the invention, are new and are intended to be included within the scope of the invention. Especially useful as intermediates are the 18-epi-reserpic acid and the 18-epi-deserpidic acid, as well as acid addition salts, N-oxides and acid addition salts of N-oxides thereof.

18α - hydroxy - 17α - lower alkoxy - 3 - epi - allo - yohimbane 16β-carboxylic acid esters may also be formed by transesterifying in 18α-hydroxy-17α-lower alkoxy-3-epi-allo-yohimbane 16β-carboxylic acid esters, a salt, an N-oxide or a salt of an N-oxide thereof, the esterified carboxyl group attached to the 16β-position, and, if desired, carrying out the optional steps.

The transesterification reaction may be achieved, for example, by treating the starting material with an alcohol, primarily a lower alkanol, e.g. methanol, ethanol, propanol, butanol, isobutanol and the like, as well as a substituted lower alkanol, such as an esterified hydroxy-lower alkanol, e.g. a lower alkoxy-lower alkanol and the like, a tertiary amino-lower alkanol, such as an N,N-di-lower alkyl-amino-lower alkanol and the like, whereby the etherified hydroxy and the tertiary amino groups are separated from the hydroxyl group of the alcohol by from two to seven carbon atoms; substituted lower alkanols are, for example, 2-methoxyethanol, 2-ethoxyethanol, 3-methoxypropanol, 2-N,N-dimethylethanol, 2-N,N-diethylamino-ethanol and the like.

Transesterification is carried out in the presence of a transesterification catalyst, particularly a basic transesterification catalyst. Such catalysts are, for example, alcoholate ions, as, for example, furnished by alkali metal lower alkanolates, e.g. lithium, sodium or potassium methanolate, ethanolate, n-propanolate, n-butanolate, or isobutanolate and the like, alkaline earth metal lower alkanolates, e.g. barium or strontium methanolate, ethanolate, n-propanolate, n-butanolate, or isobutanolate and the like, or aluminum lower alkanolates, e.g. aluminum methanolate, ethanolate, n-propanolate, isopropanolate, n-butanolate, or isobutanolate and the like. The individual alkanolate compounds are employed together with the corresponding lower alkanol used as the transesterification reagent. Other alcohols such as the substituted lower alkanols previously mentioned, may be used in the presence of the corresponding alkali metal, alkaline earth metal or aluminum alcoholates. Other basic transesterification catalysts are, for example, alkali metal cyanides, e.g. potassium cyanide and the like, or strong quaternary ammonium hydroxides, e.g. benzyltrimethyl-ammonium hydroxide and the like. The transesterification reaction may also be catalyzed by acidic reagents; inorganic acids, such as tungstic acid and the like, or organic acids, such as p-toluene sulfonic acids and the like, may be used.

Apart from the esterifying alcohols, which may simultaneously serve as diluents, other inert solvents may be used in the above-mentioned transesterification reaction; carbocyclic aryl hydrocarbons, e.g. benzene, toluene and the like, are examples of such inert solvents. If necessary, the reaction may be carried out at an elevated temperature, under increased pressure and/or in the atmosphere of an inert gas, e.g. nitrogen.

The above procedure may be illustrated, for example, by the treatment of methyl 18-epi-reserpate with a lower alkanol containing more than one carbon atom, e.g. ethanol, n-propanol and the like, in the presence of a transesterifying reagent, lower alkyl 18-epi-reserpates may be obtained, in which lower alkyl contains more than one carbon atom. Or, a lower alkyl 18-epi-reserpate, in which lower alkyl contains more than one carbon atom, may be treated with methanol in the presence of a transesterifying reagent, such as, for example, sodium methanolate to form the desired methyl 18-epi-reserpate.

The two previously shown procedures, i.e. esterification and transesterification of the 16β-carboxylic acid and 16β-carboxylic acid ester group, respectively, for the preparation of 18a-hydroxy-17a-lower alkoxy-3-epi-allo-yohimbane 16β-carboxylic acid esters are suitable for the preparation of esters, which are not easily accessible according to the above-described hydrolysis procedure or the methods described hereinbelow.

The 18a-hydroxy-17a-lower alkoxy-3-epi-allo-yohimbane 16β-carboxylic acid esters, the salts, N-oxides or salts of N-oxides may also be prepared by removing in an 18a-hydroxy-17a-lower alkoxy-allo-yohimbane 16β-carboxylic acid ester, in which a double bond extends from the 3-position or a salt of such compound, the double bond extending from the 3-position by reduction and, if desired, carrying out the optional steps. In the above starting materials the double bond extends probably from the 3-position to the 14-position, or, in the salts thereof, from the 3-position to the 4-position.

The anion in the above-mentioned salts stands primarily for the anion of a strong inorganic acid, particularly a mineral acid, such as hydrohalic acid, e.g. hydrochloric, hydrobromic acid and the like, or phosphoric acid, a halogenophosphoric acid, e.g. chlorophosphoric acid and the like, or perchloric acid or any other suitable acid. It may also represent the anion of an organic acid; a salt with an organic acid may be present whenever a solution of the starting material in an organic acid, e.g. acetic acid and the like, is used in the above-described removal procedure.

The removal of the double bond may be carried out with the help of a reduction procedure, particularly by treating a solution of the starting material in an acid, such as, for example, acetic acid (preferably in the form of aqueous acetic acid), perchloric acid and the like, with a metal. Together with the acid, the metal furnishes the reducing reagent capable of removing the double bond; zinc, in the presence of an acid, e.g. acetic, perchloric acid and the like, yields a very useful reducing reagent. Zinc in the presence of perchloric acid, which may be used in an aqueous mixture or in admixture with another acid, e.g. acetic acid, represents the preferred reagent; this reagent is particularly suitable because the rate of reduction is fast, and any contact of the starting material, as well as the reduction product, with the acidic medium can be kept to a minimum. Organic diluents, such as ethers, e.g. tetrahydrofuran, p-dioxan and the like, lower alkanones, e.g. acetone and the like, or any other suitable solvent may be present as additional diluents, if desired, together with water. The reduction may be carried out at room temperature, or, if necessary, under cooling or at an elevated temperature.

The product of the reduction procedure may be isolated, for example, by neutralizing the reaction mixture with an alkaline reagent, e.g. ammonia and the like, if desired, after removing the solvent or part of it, and extracting the organic material with a solvent or by any other suitable isolation method.

The above procedure may be illustrated, for example, by the treatment of methyl Δ³-dehydro-18-epi-reserpate, in which the double bond probably extends from the 3-position to the 14-position, or a methyl Δ³-dehydro-18-epi-reserpate salt, in which the double bond extends from the 3-position to the 4-position, with zinc in the presence of an acid, e.g. acetic, perchloric acid and the like, with the formation of the desired methyl 18-epi-reserpate.

The starting material, which is used in the above procedure is new and is intended to be included within the scope of the present invention. A preferred group of starting materials is represented, for example, by the lower alkyl Δ³-dehydro-18-epi-reserpates, e.g. methyl Δ³-dehydro-18-epi-reserpate, ethyl Δ³-dehydro-18-epi-reserpate, n-propyl Δ³-dehydro-18-epi-reserpate, isopropyl Δ³-dehydro-18-epi-reserpate, n-butyl Δ³-dehydro-18-epi-reserpate and the like, and the lower alkyl Δ³-dehydro-18-epi-deserpidates, e.g. methyl Δ³-dehydro-18-epi-deserpidate, ethyl Δ³-dehydro-18-epi-deserpidate, n-propyl Δ³-dehydro-18-epi-deserpidate, isopropyl Δ³-dehydro-18-epi-deserpidate, n-butyl Δ³-dehydro-18-epi-deserpidate and the like, in which compounds the double bond probably extends from the 3-position to the 14-position, and the salts of these compounds, in which the double bond extends from the 3-position to the 4-position. Salts of the above-mentioned compounds contain as anions those of inorganic, particularly mineral, acids, such as hydrohalic acids, e.g. hydrochloric, hydrobromic acid and the like, phosphoric acid, halogenophosphoric acids, e.g. chlorophosphoric acid and the like, or perchloric acid or any other suitable inorganic acid, as well as organic acids, e.g. acetic acid and the like.

The above-mentioned starting materials may be prepared, for example, by treating an 18β-hydroxy-17α-lower alkoxy-3-oxo-2,3-seco-allo-yohimbane 16β-carboxylic acid ester with a carbocyclic aryl sulfonic acid halide, e.g. 4-bromo-benzene sulfonic acid chloride and the like, in the presence of an organic base, e.g. pyridine and the like, reacting the resulting 18β-carbocyclic aryl-sulfonyloxy-17α-lower alkoxy-3-oxo-2,3-seco-allo-yohimbane 16β-carboxylic acid ester with a ring closing reagent, e.g. phosphorus oxychloride and the like, hydrolyzing in a resulting 18β-carbocyclic aryl-sulfonyloxy-17α-lower alkoxy-allo-yohimbane 16β-carboxylic acid ester salt, which contains a double bond extending from the 3-position, the carbocyclic aryl-sulfonyloxy group by treatment with water in the presence of an organic tertiary base, e.g. N,N,N-triethylamine and the like, and isolating the desired 18α-hydroxy-17α-lower alkoxy-allo-yohimbane 16β-carboxylic acid ester, which contains a double bond extending from the 3-position, and, if desired, converting a resulting compound into a salt thereof. The above reactions are carried out according to known or previously described methods.

The preparation of the starting materials may be modified; for example, the 18β-carbocyclic aryl-sulfonyloxy-17α-lower alkoxy-3-oxo-2,3-seco-allo-yohimbane 16β-carboxylic acid ester described hereinbefore, may be hydrolyzed by treatment with water in the presence of an organic tertiary base, e.g. N,N,N-triethylamine and the like, the free hydroxyl group in the resulting 18α-hydroxy-17β-lower alkoxy-3-oxo-2,3-seco-allo-yohimbane 16β-carboxylic acid ester may be acylated, for example, by treatment with a carboxylic acid halide, e.g. acetyl chloride, 3,4,5-trimethoxybenzoyl chloride, 4-ethoxycarbonyloxy-3,5-trimethoxybenzoyl chloride, 3,4,5-trimethoxy-cinnamoyl chloride or any other suitable carboxylic acid halide, or with a carboxylic acid anhydride, e.g. acetic acid anhydride and the like, in the presence of an organic base, e.g. pyridine and the like, the resulting 18α-acyloxy-17α-lower alkoxy-3-oxo-2,3-seco-allo-yohimbane 16β-carboxylic acid ester may be treated with a ring closing reagent, e.g. phosphorus oxychloride and the like, and the acyloxy group in the resulting 18α-acyloxy-17α-lower alkoxy-allo-yohimbane 16β-carboxylic acid ester salt, which contains a double bond extending from the 3-position, may be hydrolyzed by treatment with an alcohol, such as a lower alkanol, e.g. methanol and the like, in the presence of a basic reagent, such as an alkali metal lower alkanolate, e.g. sodium methanolate and the like, a quarternary ammonium base, e.g. benzyl-trimethyl ammonium hydroxide and the like, an alkali metal cyanide, e.g. potassium cyanide and the like, and, if desired, a resulting compound may be converted into a salt thereof. These reactions are carried out according to known or previously described methods.

An additional method for the preparation of the 18α- hydroxy-17α-lower alkoxy-3-epi-allo-yohimbane 16β-carboxylic acid esters, salts, N-oxides or salts of N-oxides thereof, comprises isomerizing an 18α-hydroxy-17α-lower alkoxy-allo-yohimbane 16β-carboxylic acid ester, a salt, an N-oxide or a salt of an N-oxide thereof, by treatment with an acid and isolating the desired 18α-hydroxy-17α-lower alkoxy-3-epi-allo-yohimbane 16β-carboxylic acid ester, a salt, an N-oxide or a salt of N-oxide thereof, and, if desired, carrying out the optional steps.

Acids used in the above isomerization procedure are, for example, organic carboxylic acids, particularly aliphatic hydrocarbon carboxylic acids, such as lower alkanoic acids, e.g. acetic, propionic acid and the like, primarily glacial acetic acid, organic sulfonic acids, particularly carbocyclic aryl sulfonic acids, e.g. p-toluene sulfonic acid and the like, or lower alkane sulfonic acids, e.g. methane sulfonic acid and the like, or strong mineral acids, such as hydrohalic acids, e.g. hydrogen chloride and the like, or mixtures of acids. For example, carbocyclic aryl sulfonic acids, e.g. p-toluene sulfonic acid and the like, may advantageously be used together with one of the aliphatic hydrocarbon carboxylic acids mentioned above, for example, glacial acetic acid and the like. The reaction may be carried out in the absence or presence of an additional solvent; for example, p-toluene sulfonic acid may also be used in the presence of an organic base, e.g. collidine and the like, whereas hydrogen chloride may be used in an anhydrous lower alkanol, e.g. methanol, ethanol and the like. Isomerization may occur at room temperature or preferably at an elevated temperature, in an open vessel or under pressure, preferably in an atmosphere of nitrogen.

Optimum yields in the isomerization reaction may be obtained by removing the desired product from the reaction milieu, thus displacing the reaction equilibrium in favor of the product. The removal may be accomplished by separating the product, if desired, in the form of a salt thereof, from the starting material by exploiting the different relative solubilities in different solvent systems. For example, the product or a salt thereof may be separated from the starting material or a salt thereof either by adsorption on a suitable material, such as alumina, paper and the like, and subsequent fractional elution, or by fractional crystallization from a solvent or a mixture of solvents. The starting material separated from the desired product may then be recycled into the isomerization process, to enhance the overall yield of the reaction.

The starting materials used in the above procedure are new and are intended to be included within the scope of the invention. The 18α-hydroxy-17α-lower alkoxy-allo-yohimbane 16β-carboxylic acid esters may be represented, for example, by the lower alkyl 18-epi-3-iso-reserpates, e.g. methyl 18-epi-3-iso-reserpate, ethyl 18-epi-3-iso-reserpate, n-propyl 18-epi-3-iso-reserpate and the like, as well as by the lower alkyl 18-epi-3-iso-deserpidates, e.g. methyl 18-epi-3-iso-deserpidate, ethyl 18-epi-3-iso-deserpidate, n-propyl 18-epi-3-iso-deserpidate and the like, or salts of such compounds.

The 18α-hydroxy-17α-lower alkoxy-allo-yohimbane 16β-carboxylic acid esters used as the starting materials in the above isomerization procedure may be prepared, for example, by removing in an 18α-hydroxy-17α-lower alkoxy-allo-yohimbane 16β-carboxylic acid ester, in which a double bond extends from the 3-position, or a salt thereof, which compounds have been described previously, the double bond extending from the 3-position, and, if desired, converting a resulting salt into the free compound, and, if desired, converting a resulting compound into a salt, an N-oxide or a salt of an N-oxide thereof.

The above-mentioned removal may be carried out by catalytic hydrogenation, for example, by treatment with hydrogen in the presence of a catalyst containing a metal of the eighth group of the periodic system, e.g. nickel and the like, such as Raney nickel and the like, preferably in the presence of a solvent, such as a lower alkanol, e.g. methanol, ethanol and the like, or any other suitable diluent. The reduction may be carried out at normal or under an increased pressure, and/or under cooling, at room temperature or at an elevated temperature. The removal of the double bond may also be accomplished by treatment with a light metal hydride, particularly a borohydride, such as an alkali metal borohydride, e.g. lithium borohydride, sodium borohydride, potassium borohydride and the like, or any other equivalent reducing reagent, according to known methods or with a metal amalgam in the presence of a moist solvent, such as an alkali metal amalgam, e.g. sodium amalgam and the like, amalgam in the presence of moist ether or any other suitable moist solvent.

The starting materials may also be obtained by hydrolyzing an 18β-carbocyclic aryl sulfonyloxy-17α-lower alkoxy allo-yohimbane 16β-carboxylic acid ester, a salt, an N-oxide or a salt of an N-oxide thereof with water in the presence of an organic tertiary amine; the above hydrolysis is carried out according to the previously described method.

As has been previously mentioned, the 18α-hydroxy-17α-lower alkoxy-3-epi-allo-yohimbane 16β-carboxylic acid esters, salts, N-oxides or salts of N-oxides may be converted into the 18α-acyloxy-17α-lower alkoxy-3-epi-allo-yohimbane 16β-carboxylic acid esters, salts, N-oxides or salts of N-oxides thereof, particularly into the compounds of the formula:

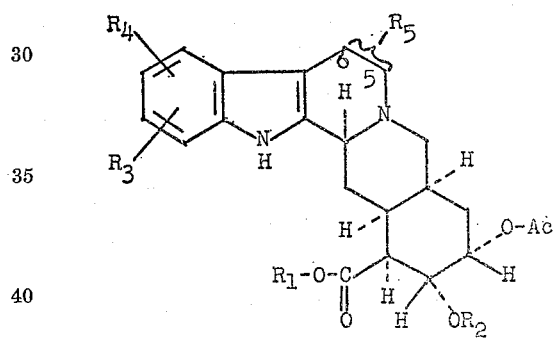

in which $R_1$, $R_2$, $R_3$, $R_4$, $R_5$ and Ac have the previously given meaning, salts, N-oxides or salts of N-oxides thereof. These compounds have tranquilizing and sedative effects, as well as antihypertensive properties and may be used accordingly; they may also be used as intermediates. These diesters are new and are intended to be included within the scope of the invention.

The group Ac in the above formula stands primarily for the acyl radical of an aliphatic carboxylic acid, a carbocyclic aryl carboxylic acid, a carbocyclic aryl-aliphatic carboxylic acid, a heterocyclic aryl carboxylic acid or a heterocyclic aryl-aliphatic carboxylic acid and the like.

An aliphatic carboxylic acid may be a lower alkanoic acid, a cycloalkanoic acid, a cycloalkyl-lower alkanoic acid, a lower alkenoic acid, a cycloalkenoic acid or a cycloalkyl-lower alkenoic acid, which acids may contain additional substituents such as functional groups attached to the aliphatic radical. Examples of such acids are lower alkanoic acids, e.g. acetic, propionic, butyric, isobutyric, trimethylacetic acid and the like, as well as hexahydrobenzoic, cyclopentylpropionic, acrylic, methylacrylic, crotonic, isocrotonic, angelic, tiglic, tetrolic acid and the like, substituted lower aliphatic acids, e.g. ethoxy-carbonic, pyruvic, methoxyacetic, phenoxyacetic, dimethylamino-aminoacetic, acetoacetic, shikimic, prephenic acid and the like, or amino carboxylic acids, e.g. glutamic acid and the like. Aliphatic carboxylic acids are also dicarboxylic acids, e.g. malonic, succinic, glutaric, malic, fumaric, maleic, tartaric, citric, tetrahydrophthalic acid and the like.

The acyl radical Ac in the above formula is primarily the acyl radical of a carbocyclic aryl carboxylic acid; benzoic acid and benzoic acids containing one or more than one of the same or of different substituents, such as lower alkyl, hydroxyl, lower alkoxy, lower alkylenedioxy, lower alkanoyloxy, lower alkoxycarbonyloxy, nitro, amino, halogen, lower alkyl-mercapto, halogeno-lower alkyl and the like, form the preferred group of acids furnishing the radical Ac. Such acids are, for example, lower alkyl-benzoic acids, e.g. o-toluic, p-toluic, 3,4,5-trimethyl-benzoic acid and the like, hydroxy-benzoic acids, e.g. 4-hydroxy-benzoic, 3,4-dihydroxy-benzoic, 2,5-dihydroxy-benzoic acid and the like, lower alkoxy-benzoic acids, particularly methoxy-benzoic acids, e.g. 4-methoxy-benzoic, 3,4-dimethoxy-benzoic, 3,4,5-trimethoxy-benzoic, 4-ethoxy-benzoic, 3,4,5-triethoxy-benzoic acid and the like, benzoic acids substituted by lower alkyl and lower alkoxy, e.g. 3,5-dimethyl-4-methoxy-benzoic acid and the like, benzoic acids, substituted by hydroxyl and lower alkoxy, e.g. vanillic, syringic acid and the like, lower alkylenedioxy-benzoic acids, e.g. piperonylic acid and the like, lower alkanoyloxy-benzoic acids, e.g. 4-acetoxy-benzoic acid and the like, lower alkoxy-carbonyloxy-benzoic acids, e.g. 4-ethoxy-carbonyloxy-benzoic acid and the like, benzoic acids substituted by lower alkoxy and lower alkoxy-carbonyloxy, e.g. O-ethoxy-carbonyl-vanillic, O-methoxycarbonyl-syringic, O-ethoxycarbonyl-syringic acid and the like, nitro-benzoic acids, e.g. 3-nitro-benzoic, 4-nitro-benzoic acid and the like, amino-benzoic acids, e.g. 3-amino-benzoic 4-amino-benzoic acid and the like, N,N-di-lower alkyl-amino-benzoic acids, e.g. 3 - N,N - dimethylamino-benzoic, 4-N,N-dimethylamino-benzoic acid and the like, halogeno-benzoic acids, e.g. 4-fluoro-benzoic, 4-chloro-benzoic, 3,4-dichloro-benzoic acid and the like, lower alkyl-mercapto-benzoic acids, e.g. 4-methylmercapto-benzoic acid and the like, halogeno-lower alkyl-benzoic acids, e.g. 4-trifluoromethyl-benzoic acid and the like, or other analogous benzoic acids. Acyl radicals may also be those of monocyclic carbocyclic aryl dicarboxylic acids e.g. phthalic, isophthalic, terephthalic acid and the like, as well as those of bicyclic carbocyclic aryl carboxylic acids, e.g. 1-naphthoic, 2-naphthoic acid or substituted naphthoic acids, e.g. 1-methoxy-2-naphthoic, 1-ethoxy-carbonyloxy-2-naphthoic acid and the like.

A carbocyclic aryl-aliphatic carboxylic acid is primarily a lower alkanoic or lower alkenoic acid substituted by monocyclic carbocyclic aryl radicals. Examples of such acids are phenyl-lower alkanoic acids, e.g. phenylacetic, 3-phenyl-propionic, diphenylacetic acid and the like, (lower alkoxy-phenyl)-lower alkanoic acids, e.g. 4-methoxy-phenylacetic, 3-(3,4,5-trimethyloxyphenyl)-propionic acid and the like, lower alkoxy-(phenyl)-lower alkanoic acids, e.g. 2-methoxy-2-phenyl-acetic acid and the like, lower alkoxy-carbonyloxy-(phenyl)-lower alkanoic acids, e.g. 2-ethoxy-carbonyloxy-2-phenyl-acetic acid and the like, phenyl-lower alkenoic acids, e.g. cinnamic acid and the like, (lower alkoxy-phenyl)-lower alkenoic acids, e.g. 4-methoxy-cinnamic, 3,4,5-trimethoxy-cinnamic acid and the like, phenyl-lower alkenoic acids, in which phenyl is substituted by lower alkoxy and hydroxyl, e.g. ferulic acid and the like, phenyl-lower alkenoic acids, in which phenyl is substituted by lower alkoxy and lower alkoxy-carbonyloxy, e.g. ethoxy-carbonyl-ferulic acid and the like, and analogous acids.

Heterocyclic aryl carboxylic acids are particularly monocyclic heterocyclic aryl carboxylic acids, which contain nitrogen, sulfur or oxygen as ring hetero atoms. Such acids are, for example, pyridine carboxylic acids, e.g. nicotinic, isonicotinic acid and the like, thiophene carboxylic acids, e.g. 2-thienoic acid and the like, furane carboxylic acids, e.g. 2-furoic acid and the like, as well as bicyclic heterocyclic aryl carboxylic acids are, for example, quinoline carboxylic acids, e.g. 6-quinoline carboxylic acid and the like. Heterocyclic aryl-lower aliphatic carboxylic acids are primarily monocyclic heterocyclic aryl-lower alkanoic acids, such as pyridyl-lower alkanoic acids, e.g. 3-pyridyl-acetic, 4-pyridyl-acetic acid and the like, thienyl-lower alkanoic acids, e.g. 2-thienyl-acetic acid and the like.

The radical Ac may also stand for the acyl radical of an organic sulfonic acid. Such acid may be selected from aliphatic sulfonic acids, particularly lower alkane sulfonic acids, e.g. methane sulfonic, ethane sulfonic acid and the like, hydroxy-lower alkane sulfonic acids, e.g. 2-hydroxy-ethane sulfonic acid and the like, or more especially from carbocyclic aryl sulfonic acids, such as monocyclic carbocyclic aryl sulfonic acids, for example, benzene sulfonic, halogeno-benzene sulfonic, e.g. 2-chloro-benzene sulfonic, 4-bromo-benzene sulfonic acid and the like, nitro-benzene sulfonic acid and the like, carboxy- or functionally converted carboxy-benzene sulfonic acids, e.g. 4-carbomethoxy-benezene sulfonic, 4-carbethoxy-benzene sulfonic, 4-carbamyl-benzene sulfonic, 4-cyano-benzene sulfonic acid and the like, lower alkyl-benzene sulfonic, e.g. p-toluene sulfonic acid and the like, or any other suitable sulfonic acid.

Salts of the above diesters or the N-oxides thereof are primarily therapeutically acceptable acid addition salts, particularly those with inorganic acids, particularly with mineral acids, e.g. hydrochloric, hydrobromic, sulfuric, phosphoric acids and the like, as well as with organic acids, e.g. acetic, tartaric, methane sulfonic acid and the like.

The diesters of the previously given formula are primarily represented by the compounds of the formula:

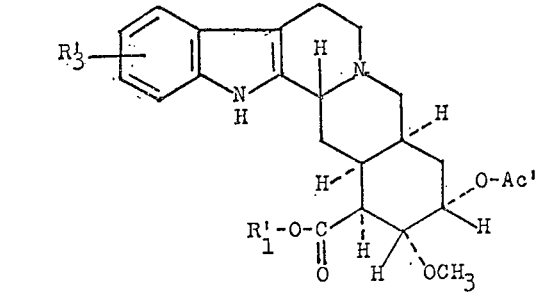

in which $R_1'$ stands for lower alkyl, containing preferably from one to four carbon atoms, e.g. methyl, ethyl, n-propyl and the like, $R_3'$ represents lower alkoxy, containing especially from one to four carbon atoms, e.g. methoxy, ethoxy and the like, and Ac' stands for the acyl radical of a lower alkanoic acid, e.g. acetic, propionic acid and the like, a hydroxy-benzoic acid, e.g. 4-hydroxy-benzoic acid and the like, a lower alkoxy-benzoic acid, e.g. 4-methoxy-benzoic, 3,4-dimethoxy-benzoic, 3,4,5-trimethoxy-benzoic acid and the like, a benzoic acid substituted by lower alkoxy and lower alkoxy-carbonyloxy, e.g. ethoxycarbonyl-vanillic, ethoxycarbonyl-syringic acid and the like, a (lower alkoxy-phenyl)-lower alkanoic acid, e.g. 3-(3,4,5-trimethoxy-phenyl)-acetic acid and the like, a (lower alkoxy-phenyl)-lower alkenoic acid, e.g. 3,4,5-trimethoxy-cinnamic acid and the like, a phenyl-lower alkenoic acid substituted by lower alkoxy and lower alkoxy-carbonyloxy, e.g. ethoxy-carbonyl-ferulic acid and the like or a pyridine carboxylic acid, e.g. nicotinic, iso-nicotinic acid and the like, as well as the acyl radical of benzene sulfonic acid, halogeno-benzene sulfonic acids, e.g. 4-bromo-benzene sulfonic acid and the like, nitro-benzene sulfonic acids, e.g. 4-nitro-benzene sulfonic acid and the like, cyano-benzene sulfonic acids, e.g. 4-cyano-benzene sulfonic acid and the like, lower alkyl-benzene sulfonic acids, e.g. p-toluene sulfonic acid and the like, or the acid addition salts, such as the therapeutically acceptable acid addition salts, of such compounds.

This group of compounds may be represented by lower alkyl 18-epi-O-(lower alkoxy-benzoyl)-reserpates, e.g. methyl 18-epi-O-(4-methoxy-benzoyl)-reserpate, 18-epi-reserpine, ethyl 18-epi-O-(3,4,5-trimethoxy-benzoyl)-reserpate and the like, lower alkyl 18-epi-O-(O-lower alkoxy-carbonyl-syringoyl)-reserpates, e.g. 18-epi-syrosingopine, ethyl 18-epi-O-(O-methoxy-carbonyl-syringoyl)-reserpate and the like, lower alkyl 18-epi-O-(lower alkoxy-cinnamoyl)-reserpates, e.g. methyl 18-epi-O-(4-methoxy-cinnamoyl)-reserpate, 18-epi-rescinnamine and the like, lower alkyl 18-epi-O-(O-lower alkoxy-carbonyl-feruloyl)-reserpates, e.g. methyl 18-epi-O-(O-ethoxy-carbonyl-feruloyl)-reserpate and the like, or therapeutically acceptable acid addition salts thereof. Another group of preferred diesters is represented by the lower alkyl 18-epi-O-(lower alkoxy-benzoyl)-deserpidates, e.g. methyl 18-epi-O-(3,4 - dimethoxy-benzoyl)-deserpidate, 18-epi-deserpidine, ethyl 18-epi-O-(3,4,5-trimethoxy-benzoyl)-deserpidate and the like, or the therapeutically acceptable acid addition salts of such compounds. A further group of important compounds of the above type may be represented by the lower alkyl 18-epi-O-(benzene sulfonyl)-reserpates, e.g. methyl 18-epi-O-(benzene sulfonyl)-reserpate and the like, lower alkyl 18-epi-O-(halogeno-benzene sulfonyl)-reserpates, e.g. methyl 18-epi-O-(4-bromobenzene sulfonyl)-reserpate and the like, lower alkyl 18-epi-O-(carbo-lower alkoxy-benzene sulfonyl)-reserpates, e.g. methyl 18-epi-O-(4-carbethoxy-benzene sulfonyl)-reserpate and the like, lower alkyl 18-epi-O-(carbomyl-benzene sulfonyl)-reserpates, e.g. methyl 18-epi-O-4-carbamyl-benzene sulfonyl)-reserpate and the like, lower alkyl 18-epi-O-(cyano-benzene sulfonyl)-reserpates, e.g. methyl 18 - epi-O-(4-cyano-benzene sulfonyl)-reserpate and the like, lower alkyl 18-epi-O-(methyl-benzene sulfonyl)-reserpates, e.g. methyl 18-epi-O-(p-toluene sulfonyl)-reserpate and the like, as well as the corresponding lower alkyl 18-epi-O-(monocyclic carbocyclic aryl sulfonyl)-deserpidates, such as lower alkyl 18-epi-O-(halogeno-benzene sulfonyl)-deserpidates, e.g. methyl 18-epi-O-(4-bromo-benzene sulfonyl)-deserpidate and the like, lower alkyl 18-epi-O-(methyl-benzene sulfonyl)-deserpidates, e.g. methyl 18-epi-O-(p-toluene sulfonyl)-deserpidate and the like, and acid addition salts thereof.

18α - acyloxy-17α-lower alkoxy-3-epi-allo-yohimbane 16β-carboxylic acid esters, salts, N-oxides or salts of N-oxides thereof, may be used as medicaments in the form of pharmaceutical preparations, which contain these compounds in admixture with a pharmaceutical organic or inorganic, solid or liquid carrier suitable for enteral or parenteral administration. For making up the preparations there can be employed inert substances which are compatible with the new compounds, such as water, gelatine, lactose, starches, stearic acid, magnesium stearate, stearyl alcohol, talc, vegetable oils, benzyl alcohols, gums, waxes propylene glycol, polyalkylene glycols or any other known inert carrier used in medicaments. The pharmaceutical preparation may be in solid form, for example, as tablets, capsules, dragees and the like, or in liquid form, for example, as solutions, suspension, emulsions and the like. If desired, they may contain additional substances such as preserving, stabilizing, wetting, emulsifying agents and the like, salts for varying the osmotic pressure, buffers or any other auxiliary substances. They may also contain, in combination, other therapeutically useful substances.

The 18α-acyloxy-17α-lower alkoxy-3-epi-allo-yohimbane 16β-carboxylic acid esters, salts, N-oxides or salts of N-oxides thereof may be prepared, for example, by esterifying in an 18α-hydroxy-17α-lower alkoxy-3-epi-allo-yohimbane 16β-carboxylic acid ester, a salt, an N-oxide or a salt of an N-oxide thereof, the free hydroxyl group by treatment with a reactive functional derivative of an organic acid, and, if desired converting a resulting salt into the free compound, and/or, if desired, converting a resulting compound into a salt, an N-oxide or a salt of an N-oxide thereof.

The above esterification reaction is carried out according to known methods; a reactive functional derivative of an organic acid is primarily a halide, especially the chloride, or the anhydride of such acid, which is represented by the previously mentioned group of organic carboxylic and sulfonic acids. The reaction occurs in the presence of a basic reagent; liquid organic bases, such as pyridine and the like, are particularly suited as reagents, and may also serve as diluents. Other inert organic solvents may be added to ensure complete solution. The esterification is performed under the exclusion of moisture, if necessary, in the atmosphere of an inert gas, e.g. nitrogen, and/or while cooling.

The 18α-acyloxy-17α-lower alkoxy - 3 - epi-allo-yohimbane 16β-carboxylic acid esters or salts, N-oxides and salts of N-oxides thereof may also be prepared, for example, by removing in an 18α-acyloxy-17α-lower alkoxy-allo-yohimbane 16β-carboxylic acid ester, which contains a double bond extending from the 3-position, or a salt thereof, the double bond extending from the 3-position by reduction, and, if desired, carrying out the optional steps.

As has been previously mentioned, the double bond in the free base extends probably from the 3-position to the 14-position, whereas in the salts it connects the 3-position with the 4-position. Removal of the double bond may be carried out according to the previously shown procedure; zinc in the presence of acetic or perchloric acid and of an inert organic solvent represents the preferred reducing reagent.

The starting materials used in the above procedure are new and are intended to be included within the scope of this invention. They may be represented by the lower alkyl $\Delta^3$-dehydro-18-epi-O-acyl-reserpates and lower alkyl $\Delta^3$-dehydro-18-epi-O-acyl-deserpidates, in which a double bond extends from the 3-position probably to the 14-position, and salts thereof, in which the double bond extends from the 3-position to the 4-position. The acyl group in the above compounds represents more especially the acyl radical of a lower alkanoic acid, e.g. acetic, propionic acid and the like, a hydroxy-benzoic acid, e.g. 4-hydroxy-benzoic acid and the like, a lower alkoxy-benzoic acid, e.g. 4-methoxy-benzoic, 3,4-dimethoxy-benzoic, 3,4,5-trimethoxy-benzoic acid and the like, a benzoic acid substituted by lower alkoxy and lower alkoxycarbonyloxy, e.g. ethoxycarbonyl-vanillic, ethoxycarbonyl-syringic acid and the like, a (lower alkoxy-phenyl)-lower alkanoic acid, e.g. 3-(3,4,5-trimethoxy-phenyl)-acetic acid and the like, a (lower alkoxy-phenyl)-lower alkenoic acid, e.g. 3,4,5-trimethoxy-cinnamic acid and the like, a phenyl-lower alkenoic acid substituted by lower alkoxy and lower alkoxy-carbonyloxy, e.g. ethoxy-carbonyl-ferulic acid and the like, or a pyridine carboxylic acid, e.g. nicotinic, isonicotinic acid and the like, as well as the acyl radical of benzene sulfonic acid, halogeno-benzene sulfonic acids, e.g. 4-bromo-benzene sulfonic acid and the like, nitro-benzene sulfonic acids, e.g. 4-nitro-benzene sulfonic acid and the like, cyano-benzene sulfonic acids, e.g. 4-cyano-benzene sulfonic acid and the like, lower alkyl-benzene sulfonic acids, e.g. p-toluene sulfonic acid and the like, or the acid addition salts. Salts of the above-mentioned compounds contain as anions those of inorganic, particularly mineral, acids, such as hydrohalic acids, e.g. hydrochloric, hydrobromic acid and the like, phosphoric acid, halogeno-phosphoric acids, e.g. chlorophosphoric acid and the like, or perchloric acid or any other suitable inorganic acid, as well as organic acids, e.g. acetic acid and the like. These compounds may be illustrated by the lower alkyl $\Delta^3$-dehydro-18-epi-O-(lower alkoxy-benzoyl)-reserpates, e.g. methyl $\Delta^3$-dehydro-18-epi-O-(4-methoxy-benzoyl)-reserpate, $\Delta^3$-dehydro-18-epi-reserpine, ethyl $\Delta^3$-dehydro-18-epi-O-(3,4,5-trimethoxybenzoyl)-reserpate and the like, lower alkyl $\Delta^3$-dehydro-18 - epi-O-(O-lower alkoxy-carbonyl-syringoyl)-reserpates, e.g. $\Delta^3$-dehydro - 18 - epi-syrosingopine, ethyl $\Delta^3$-dehydro - 18 - epi-O-(O-methoxy-carbonyl-syringoyl)-reserpate and the like, lower alkyl $\Delta^3$-dehydro-18-epi-O-(lower alkoxy-cinnamoyl)-reserpates, e.g. methyl $\Delta^3$-dehydro-18-epi-O-(4-methoxy-cinnamoyl)-reserpate, $\Delta^3$-dehydro-18-epi-rescinnamine and the like, lower alkyl $\Delta^3$-dehydro-18-epi-O-(O-lower alkoxy-carbonyl-feruloyl)-reserpates, e.g. methyl $\Delta^3$-dehydro-18-epi-O-(O-ethoxy-carbonyl-feruloyl)-reserpate and the like, and analogous compounds, in which the double bond extends from the 3-position probably to the 14-position, and salts thereof, in which the double bond extends from the 3-position to the 4-position. Another group of preferred starting materials may be represented by the lower alklyl $\Delta^3$-dehydro-18-epi-O-(lower alkoxy-benzoyl)-deserpidates, e.g. methyl $\Delta^3$-dehydro-18-epi-O-(3,4-dimethoxy-benzoyl)-deserpidate, $\Delta^3$-dehydro-18-epi-deserpidine, ethyl $\Delta^3$-dehydro-18-epi-O-(3,4,5-trimethoxy-benzoyl)-deserpidate and the like, in which compounds the double bond extends from the 3-position probably to the 14-position, and salts thereof, in which the double bond extends from the 3-position to the 4-position. A further group of important intermediates may be represented by the lower alkyl $\Delta^3$-dehydro-18-epi-O-(benzene sulfonyl)-reserpates, e.g. methyl $\Delta^3$-dehydro-18-epi-O-(benzene sulfonyl)-reserpate and the like, lower alkyl $\Delta^3$-dehydro-18-epi-O-(halogeno-benzene sulfonyl)-reserpates, e.g. methyl $\Delta^3$-dehydro-18-epi-O-(4-bromo-benzene sulfonyl)-reserpate and the like, lower alkyl $\Delta^3$-dehydro-18-epi-O-(carbo-lower alkoxy-benzene sulfonyl)-reserpates, e.g. methyl $\Delta^3$-dehydro-18-epi-O-(4-carbethoxy-benzene sulfonyl)-reserpate and the like, lower alkyl $\Delta^3$-dehydro-18-epi-O-(carbamyl-benzene sulfonyl)-reserpates, e.g. methyl $\Delta^3$-dehydro-18-epi-O-(4-carbamyl-benzene sulfonyl)-reserpate and the like, lower alkyl $\Delta^3$-dehydro-18-epi-O-(cyano-benzene sulfonyl)-reserpates, e.g. methyl $\Delta^3$-dehydro-18-epi-O-(4-cyano-benzene sulfonyl)-reserpate and the like, lower alkyl $\Delta^3$-dehydro-18-epi-O-(methyl-benzene sulfonyl)-reserpates, e.g. methyl $\Delta^3$-dehydro-18-epi-O-(p-toluene sulfonyl)-reserpate and the like, as well as the corresponding lower alkyl $\Delta^3$-dehydro-18-epi-O-(mono-cyclic carbocyclic aryl sulfonyl)-deserpidates, such as lower alkyl $\Delta^3$-dehydro-18-epi-O-(halogeno-benzene sulfonyl)-deserpidates, e.g. methyl $\Delta^3$-dehydro-18-epi-O-(4-bromo-benzene sulfonyl)-deserpidate and the like, lower alkyl $\Delta^3$-dehydro-18-epi-O-(methyl-benzene sulfonyl)-deserpidates, e.g. methyl $\Delta^3$-dehydro-18-epi-O-(p-toluene sulfonyl)-deserpidate and the like, and analogous compounds, in which the double bond extends from the 3-position probably to the 14-position, and salts thereof, in which the double bond extends from the 3-position to the 4-position.

The above described starting materials may be prepared, for example, by esterifying in an 18α-hydroxy-17α-lower alkoxy-3-oxo-2,3-seco-allo-yohimbane 16β-carboxylic acid ester the free hydroxyl group by treatment with a reactive functional derivative of an acid and ring-closing the resulting 18α-acyloxy-17α-lower alkoxy-3-oxo-2,3-seco-allo-yohimbane 16β-carboxylic acid ester by treatment with an acid ring closing reagent. Esterification and ring closure are carried out according to known methods, such as those mentioned hereinbefore.

An additional procedure for the preparation of the 18α-acyloxy-17α-lower alkoxy-3-epi-allo-yohimbane 16β-carboxylic acid esters, salts, N-oxides or salts of N-oxides thereof, comprises isomerizing an 18α-acyloxy-17α-lower alkoxy-allo-yohimbane 16β-carboxylic acid ester, a salt, an N-oxide or a salt of an N-oxide thereof, by treatment with an acid, and isolating the desired 18α-acyloxy-17α-lower alkoxy-3-epi-allo-yohimbane 16β-carboxylic acid ester, a salt, an N-oxide or a salt of an N-oxide thereof, and, if desired, carrying out the optional steps.

The isomerization procedure is carried out according to known methods, such as the one described hereinbefore.

The starting materials used in the above procedure are new and are intended to be included within the scope of this invention. They may be represented, for example, by the lower alkyl 18-epi-O-acyl-3-iso-reserpates and the lower alkyl 18-epi-O-acyl-3-iso-deserpidates, and acid addition salts thereof. The acyl group in the above compounds represents more especially the acyl radical of a lower alkanoic acid, e.g. acetic, propionic acid and the like, a hydroxy-benzoic acid, e.g. 4-hydroxy-benzoic acid and the like, a lower alkoxy-benzoic acid, e.g. 4-methoxy-benzoic, 3,4-dimethoxy-benzoic, 3,4,5-trimethoxy-benzoic acid and the like, a benzoic acid substituted by lower alkoxy and lower alkoxy-carbonyloxy, e.g. ethoxycarbonyl-vanillic, ethoxycarbonyl-syringic acid and the like, a (lower alkoxy-phenyl)-lower alkanoic acid, e.g. 3-(3,4,5-trimethoxy-phenyl)-acetic acid and the like, a (lower alkoxy-phenyl)-lower alkenoic acid, e.g. 3,4,5-trimethoxy-cinnamic acid and the like, a phenyl-lower alkenoic acid substituted by lower alkoxy and lower alkoxy-carbonyloxy, e.g. ethoxy-carbonyl-ferulic acid and the like, or a pyridine carboxylic acid, e.g. nicotinic, isonicotinic acid and the like, as well as the acyl radical of benzene sulfonic acid, halogeno-benzene sulfonic acids, e.g. 4-bromo-benzene sulfonic acid and the like, nitro-benzene sulfonic acids, e.g. 4-nitro-benzene sulfonic acid and the like, cyano-benzene sulfonic acids, e.g. 4-cyano-benzene sulfonic acid and the like, lower alkyl-benzene sulfonic acids, e.g. p-toluene sulfonic acid and the like, or the acid addition salts. These compounds may be illustrated by the lower alkyl 18-epi-O-(lower alkoxy-benzoyl)-3-iso-reserpates, e.g. methyl 18-epi-O-(4-methoxy-benzoyl)-3-iso-reserpate, 18-epi-3-iso-reserpine, ethyl 18-epi-O-(3,4,5-trimethoxybenzoyl)-3-iso-reserpate and the like, lower alkyl 18-epi-O-(O-lower alkoxy-carbonyl-syringoyl)-3-iso-reserpates, e.g. 18-epi-3-iso-syrosingopine, ethyl 18-epi-O-(O-methoxy-carbonyl-syringoyl)-3-iso-reserpate and the like, lower alkyl 18-epi-O-(lower alkoxy-cinnamoyl)-3-iso-reserpates, e.g. methyl 18-epi-O-(4-methoxy-cinnamoyl)-3-iso-reserpate, 18-epi-3-iso-rescinnamine and the like, lower alkyl 18-epi-O-(O-lower alkoxy-carbonyl-feruloyl)-3-iso-reserpates, e.g. methyl 18-epi-O-(O-ethoxy-carbonyl-feruloyl)-3-iso-reserpate and the like, and analogous compounds, and acid addition salts thereof. Another group of preferred starting materials may be represented by the lower alkyl 18-epi-O-(lower alkoxy-benzoyl)-3-iso-deserpidates, e.g. methyl 18-epi-O-(3,4-dimethoxy-benzoyl)-3-iso-deserpidate, 18-epi-3-iso-deserpidine, ethyl 18-epi-O-(3,4,5-trimethoxy-benzoyl)-3-iso-deserpidate and the like, and acid addition salts thereof. A further group of important intermediates may be represented by the lower alkyl 18-epi-O-(benzene sulfonyl)-3-iso-reserpates, e.g. methyl 18-epi-O-(benzene sulfonyl)-3-iso-reserpate and the like, lower alkyl 18-epi-O-(halogeno-benzene sulfonyl)-3-iso-reserpates, e.g. methyl 18-epi-O-(4-bromo-benzene sulfonyl)-3-iso-reserpate and the like, lower alkyl 18-epi-O-(carbo-lower alkoxy-benzene sulfonyl)-3-iso-reserpates, e.g. methyl 18-epi-O-(4-carbethoxy-benzene sulfonyl)-3-iso-reserpate and the like, lower alkyl 18-epi-O-(carbamyl-benzene sulfonyl)-3-iso-reserpates, e.g. methyl 18-epi-O-(4-carbamyl-benzene sulfonyl)-3-iso-reserpate and the like, lower alkyl 18-epi-O-(cyano-benzene sulfonyl)-3-iso-reserpates, e.g. methyl 18-epi-O-(4-cyano-benzene sulfonyl)-3-iso-reserpate and the like, lower alkyl 18-epi-O-(methyl-benzene sulfonyl)-3-iso-reserpates, e.g. methyl 18-epi-O-(p-toluene sulfonyl)-3-iso-reserpate and the like, as well as the corresponding lower alkyl 18-epi-O-(monocyclic carbocyclic aryl sulfonyl)-3-iso-deserpidates, such as lower alkyl 18-epi-O-(halogeno-benzene sulfonyl)-3-iso-deserpidates, e.g. methyl 18-epi-O-(4-bromo-benzene sulfonyl)-3-iso-deserpidate and the like, lower alkyl 18-epi-O-(methyl-benzene sulfonyl)-3-iso-deserpidates, e.g. methyl 18-epi-O-(p-toluene sulfonyl)-3-iso-deserpidate and the like, and acid addition salts of such compounds.

The above starting materials may be obtained, for example, by removing in an 18α-acyloxy-17α-lower alkoxy-allo-yohimbane 16β-carboxylic acid ester, in which a double bond extends from the 3-position, or a salt thereof, the double bond extending from the 3-position, and, if desired, carrying out the optional step. The removal of the double bond is carried out according to known methods, for example, the procedures mentioned hereinbefore.

Since the above-mentioned diesters may be prepared independently from the 18α-hydroxy-17α-lower alkoxy-3- epi-allo-yohimbane 16β-carboxylic acid esters, the latter may be obtained by hydrolyzing in an 18α-acyloxy-17α-lower alkoxy-3-epi-allo-yohimbane 16β-carboxylic acid ester, a salt, an N-oxide or a salt of an N-oxide thereof, the acyloxy group attached to the 18α-position, and, if desired, carrying out the optional steps. The above hydrolysis may be carried out according to known methods, for example, by treatment with an alcohol in the presence of an alcoholysis catalyst, for example, with a lower alkanol, e.g. methanol and the like, in the presence of an alkali metal, e.g. sodium and the like, lower alkanolate, e.g. methanolate and the like, or a quaternary ammonium hydroxide, e.g. benzyl trimethyl ammonium hydroxide, an alkali metal cyanide, e.g. potassium cyanide and the like, or any other suitable reagent.

The compounds of the present invention, as well as the starting materials and intermediates used in their formation, may be present in the form of mixtures of racemates, single racemates or antipodes. Racemates of intermediates and final products may be resolved into antipodes. Racemates of final products or intermediates, which form acid addition salts, may be resolved, for example, by treating a solution of the free racemic base in a solvent, such as, for example, a lower alkanol, e.g. methanol, ethanol and the like, a halogenated lower aliphatic hydrocarbon, e.g. methylenechloride, chloroform and the like, or any other suitable solvent, with one of the optically active forms of an acid containing an asymmetric carbon atom, which may be employed in solution, for example, in one of the above-mentioned solvents. A salt may then be isolated, which is formed by the optically active acid with one of the optically active forms of the base. Especially useful as optically active forms of salt-forming acids having an asymmetric carbon atom are D- and L-tartaric acid, as well as the optically active forms of di-o-toluyl-tartaric, malic, madelic, camphor-10-sulfonic, quinic acid and the like.

The optically active forms may also be obtained by resolution with biochemical methods.

From a resulting salt, the free and optically active compounds may be obtained according to known methods used for the conversion of a salt into a free compound, for example, as outlined hereinbelow; a resulting optically active base may be converted into an acid addition salt with one of the acids mentioned hereinbefore.

The compounds of this invention or the N-oxides thereof may be obtained in the form of the free bases or as the salts thereof. A salt including the salt of an N-oxide, may be converted into the free base, for example, by reacting the former with an alkaline reagent, such as, for example, aqueous ammonia and the like. A free base or the free N-oxide thereof may be converted into its therapeutically useful acid addition salts with one of the inorganic or organic acids outlined hereinbefore; the reacton may be carried out, for example, by treating a solution of the free base in a suitable solvent, such as a lower alkanol, e.g. methanol, ethanol, propanol, isopropanol and the like, a halogenated aliphatic hydrocarbon, e.g. methylene chloride, chloroform and the like, with the acid or a solution thereof and isolating the resulting salt. The salts may also be obtained as the hemi-hydrates, monohydrates, sesquihydrates or polyhydrates depending on the conditions used in the formation of the salts.

N-oxides of the compounds of the present invention may be formed according to known methods; for example, a resulting compound, preferably a solution thereof in an inert solvent, may be reacted with an N-oxidizing reagent, such as, for example, hydrogen peroxide, ozone, persulfuric acid, or more especially, organic peracids, such as organic percarboxylic acids, e.g. peracetic, perbenzoic, monoperphthalic acid and the like, or persulfonic acids, e.g. p-toluene persulfonic acid and the like. Inert solvents are, for example, halogenated lower alkanes, e.g. methylene chloride, chlorofrom, ethylene chloride and the like, lower alkanols, e.g. methanol, ethanol and the like, or any other suitable solvent. In the N-oxidation reaction an excess of the oxidation reagent and/or an increase in temperature should be avoided in order to prevent oxidative degradation.

The invention also comprises any modification of the process wherein a compound obtainable as an intermediate at any stage of the process is used as starting material and the remaining step(s) of the process is (are) carried out. It also includes any new intermediates, which may be formed in one of the procedures outlined hereinbefore.

In the process of this invention such starting materials are preferably used which lead to final products mentioned in the beginning as preferred embodiments of the invention.

The following examples illustrate the invention and are not to be construed as being limitations thereon. Temperatures are given in degrees centigrade.

*Example I*

A mixture of 6.34 g. methyl 18-O-(4-bromo-benzene sulfonyl)-reserpate, 100 ml. of water, 300 ml. of p-dioxane and 1.2 g. of N,N,N-triethylamine is heated on the steam-bath for 41 hours under an atmosphere of nitrogen. The organic solvent is evaporated under reduced pressure, during which operation a precipitate is formed, which is filtered off and dissolved in methylene chloride. The resulting organic solution is extracted with several portions of 5-percent aqueous hydrochloric acid until the acidic extracts no longer give a precipitate on addition of ammonium hydroxide. The combined precipitates, resulting from the treatment of the acidic extracts with aqueous ammonia, are washed with water and dried to yield 2.73 g. of methyl 18-epireserpate monohydrate, M.P. 220–222° (decomposition). Upon drying at 140° under reduced pressure, the above hydrate can be converted into the solvent-free methyl 18-epi-reserpate, M.P. 220–222°, $[\alpha]_D^{25} = -80.5$ (in chloroform).

The starting material used in the above reaction may be prepared as follows: To a solution of 10.0 g. of methyl reserpate in 70 ml. of pyridine is added 15.8 g. of 4-bromo-benzene sulfonyl chloride; the reaction mixture is allowed to stand at room temperature for 2½ days and is then poured into ice-water. The organic material is extracted with chloroform, the organic extract is washed with a 5 percent aqueous sodium hydroxide solution and subsequently with water until a neutral reaction is obtained. The organic solution is evaporated to dryness, and the resulting methyl 18-O-(4 - bromo - benzene sulfonyl)-reserpate is recrystallized from acetone, M.P. 209–212°; yield: 5.64 g.

By substituting in the above procedure for the preparation of the starting material, other 18β-hydroxy-17α-lower alkoxy-3-epi-allo-yohimbane 16β - carboxylic acid esters for methyl reserpate, and treating those with 4-bromo-benzene sulfonyl chloride or any other suitable carbocyclic aryl sulfonyl halide, such as 4-nitro-benzene sulfonyl chloride and the like, and hydrolyzing the resulting 18β-carbocyclic aryl-sulfonyloxy - 17α - lower alkoxy-3-epi-allo-yohimbane 16β-carboxylic acid esters with water in the presence of an organic tertiary amine, there may be prepared other 18α-hydroxy-17β-lower alkoxy-3-epi-allo-yohimbane 16β-carboxylic acid esters, such as lower alkyl 18-epi-reserpate other than methyl 18-epi-reserpate, for example, ethyl 18-epi-reserpate, n-propyl 18-epi-reserpate, isopropyl 18-epi-reserpate, n-butyl 18-epi-reserpate and the like, lower alkyl 18-epi-deserpidates, e.g. methyl 18-epi-deserpidate, ethyl 18-epi-deserpidate and the like, lower alkyl 10-methoxy-18-epi-deserpidates, e.g. methyl 10 - methoxy - 18 - epi - deserpidate, ethyl 10-methoxy-18-epi-deserpidate and the like, as well as, for example, lower alkyl 5-methyl - 18 - epi-reserpates, e.g. methyl 5-methyl-18-epi-reserpate, ethyl 5-methyl-18-epi-reserpate and the like, lower alkyl 5-methyl-18-epi-deserpidates, e.g. methyl 5-methyl-18-epi-deserpidate, ethyl 5-methyl-18-epi-deserpidate and the like, lower alkyl 6-methyl - 18 - epi - reserpates, e.g. methyl 6 - methyl-18-epi-reserpate, n-propyl 6-methyl-18-epi-reserpate and the like, lower alkyl 9-methyl-18-epi-deserpidates, e.g. methyl 9-methyl - 18 - epi - deserpidate, ethyl 9-methyl-18-epi-deserpidate and the like, lower alkyl 11-methyl-18-epi-deserpidates, e.g. methyl 11-methyl-18-epi-deserpidate, ethyl 11-methyl-18-epi-deserpidate, n - propyl 11-methyl-18-epi-deserpidate and the like, lower alkyl 9-methoxy-18-epi-deserpidates, e.g. methyl 9-methoxy - 18 - epi-deserpidate, ethyl 9-methoxy-18-epi-deserpidate and the like, lower alkyl 10 - methoxy - 18 - epi - reserpates, e.g. methyl 10-methoxy-18-epi-reserpate, ethyl 10-methoxy-18-epi-reserpate and the like, lower alkyl 12-methoxy-18-epi-deserpidates, e.g. methyl 12-methoxy - 18 - epi-deserpidate, ethyl 12-methoxy-18-epi-deserpidate, n - propyl 12 - methoxy-18-epi-deserpidate and the like, lower alkyl 11-ethoxy-18-epi-deserpidates, e.g. methyl 11-ethoxy-18-epi-deserpidate, ethyl 11-ethoxy-18-epi-deserpidate and the like, lower alkyl 11-n-propyloxy-18-epi-deserpidates, e.g. methyl 11-n-propyloxy-18-epi-deserpidate, ethyl 11-n-propyloxy-18-epi-deserpidate and the like, lower alkyl 11-isopropyloxy-18-epi-deserpidates, e.g. methyl 11-isopropyloxy-18-epi-deserpidate, ethyl 11-isopropyloxy-18-epi-deserpidate, n-butyl 11-isopropyloxy-18-epi-deserpidate and the like, lower alkyl 11-n-butyloxy-18-epi-deserpidates, e.g. methyl 11-n-butyloxy-18-epi-deserpidate, ethyl 11-n-butyloxy-18-epi-deserpidate and the like, lower alkyl 10,11-methylene-dioxy-18-epi-deseripdates, e.g. methyl 10,11-methylene-dioxy - 18 - epi-deserpidate, ethyl 10,11-methylenedioxy-18-epi-deserpidate and the like, lower alkyl 10-benzyloxy-18-epi-deserpidates, e.g. methyl 10-benzyloxy-18-epi-deserpidate, ethyl 10-benzyloxy-18-epi-deserpidate, n-propyl 10-benzyloxy-18-epi-deserpidate and the like, lower alkyl 11-benzyloxy-18-epi-deserpidates, e.g. methyl 11-benzyloxy-18-epi-deserpidate, ethyl 11-benzyloxy-18-epi-deserpidate and the like, lower alkyl 11-methylmercapto-18-epi-deserpidates, e.g. methyl 11-methylmercapto-18-epi-deserpidate, ethyl 11-methylmercapto-18-epi-deserpidate, n-propyl 11-methylmercapto-18-epi-deserpidate and the like, lower alkyl 11-ethylmercapto-18-epi-deserpidates, e.g. methyl 11-ethylmercapto-18-epi-deserpidate, ethyl 11-ethylmercapto-18-epi-deserpidate and the like, lower alkyl 10-chloro-18-epi-deserpidates, e.g. methyl 10-chloro-18-epi-deserpidate, ethyl 10-chloro-18-epi-deserpidate, isopropyl 10-chloro-18-epi-deserpidate and the like, lower alkyl 10-bromo-18-epi-reserpates, e.g. methyl 10-bromo-18-epi-reserpate, ethyl 10 - bromo-18-epi-reserpate and the like, lower alkyl 9,10-dimethoxy-18-epi-reserpates, e.g. methyl 9,10-dimethoxy-18-epi-reserpate, ethyl 9,10-dimethoxy-18-epi-reserpate and the like, lower alkyl 17α-desmethoxy-17α-ethoxy-18-epi-reserpates, e.g. methyl 17α-desmethoxy - 17α - ethoxy-18-epi-reserpate, n-propyl 17α-desmethoxy - 17α - ethoxy-18-epi-reserpate and the like, lower alkyl 17α - desmethoxy-17α-n-propyloxy-18-epi-reserpates, e.g. methyl 17α - desmethoxy-17α-n-propyloxy-18-epi-reserpate, ethyl 17α-desmethoxy-17α-n-propyloxy-18-epi-reserpate and the like, lower alkyl 17-α-desmethoxy-17α-isopropyloxy - 18 - epi - reserpates, e.g. methyl 17α-desmethoxy-17α-isopropyloxy-18-epi-reserpate, ethyl 17α-desmethoxy - 17α - isopropyloxy-18-epi-reserpate and the like, lower alkyl 17α - desmethoxy-17α-ethoxy-18-epi-deserpidates, e.g. methyl 17α-desmethoxy-17α-ethoxy-18-epi-deserpidate, ethyl 17α-desmethoxy-17α-ethoxy-18-epi-deserpidate and the like, and salts thereof.

*Example 2*

A total of 4.32 g. of methyl 18-epi-reserpate monohydrate is dissolved in 50 ml. of pyridine by gentle warming; the solution is cooled to room temperature and 6.7 g. of 4-bromo-benzene sulfonyl chloride is added. The flask is flushed with nitrogen and is allowed to stand for three days in the dark. The mixture is poured into 200 ml. of ice-water, and the organic material is extracted with methylene chloride. The organic extracts are combined, washed once with water, twice with a 5 percent aqueous solution of sodium carbonate and once with a saturated aqueous solution of sodium chloride. After drying, the organic solvent is evaporated under reduced pressure at 50°, benzene is added to the residue and the evaporation procedure is repeated to completely remove the pyridine. Again, benzene is added, the precipitate is filtered off and washed with cold benzene. The crude material is recrystallized from acetonitrile to yield 2.92 g. of the desired methyl 18-epi-O-(4-bromo - benzene sulfonyl) - reserpate, M.P. 210–212° (decomposition), $[\alpha]_D^{26} = -32.5°$ (in chloroform).

*Example 3*

To a solution of 0.9 g. of methyl 18-epi-reserpate monohydrate in 10 ml. of pyridine, which after initial gentle warming is then cooled to room temperature, is added 1.92 g. of p-toluene sulfonic acid chloride. The flask is flushed with nitrogen and then allowed to stand in the dark for three days. The red solution is poured into 50 ml. of ice-water and the organic material is extracted with methylene chloride; the organic solution is washed with a 5 percent aqueous solution of sodium carbonate, water and a saturated solution of sodium chloride and then dried over sodium sulfate. The organic solvent together with some pyridine is evaporated under reduced pressure at a temperature not exceeding 60°. Residual pyridine is removed by the addition of benzene and re-evaporation of the solvent. The crude, brown, solid residue is first washed with cold acetonitrile and then recrystallized from that solvent to yield 0.76 g. of the white crystalline methyl 10-epi-O-(p-toluene sulfonyl)-reserpate hemihydrate, M.P. 222–225° (decomposition), $[\alpha]_D^{27°} = -35.5°$ (chloroform).

Additional esters, which may be prepared according to the above procedure are, for example, ethyl 18-epi-O-(4-bromo-benzene sulfonyl)-reserpate, methyl 18-epi-O-(4-bromo-benzene sulfonyl)-deserpidate, methyl 18-epi-O-(4-cyano-benzene sulfonyl)-deserpidate, methyl 18-epi-O-(4-bromo-benzene sulfonyl) - 10 - methoxy-deserpidate, ethyl 10-methoxy-18-epi-O-(p-toluene sulfonyl) - deserpidate, methyl 10-methoxy-18-epi-O-(4-nitro-benzene sulfonyl)-deserpidate and the like.

*Example 4*

To a solution of 1.2 g. of methyl 18-epi-reserpate monohydrate in 15 ml. of pyridine is added 2.1 g. of 3,4,5 - trimethoxybenzoyl chloride; the reaction vessel flushed with nitrogen and then allowed to stand in the dark and at room temperature for three days. The reaction mixture is worked up as shown in Example 3 to yield the desired 18-epi-reserpine.

Other esters, which may be prepared according to the above procedure using the appropriate starting materials and carboxylic acid halides, particularly chlorides, are, for example, methyl 18-epi-O-acetyl-reserpate,
methyl 18-epi-O-(4-hydroxy-benzoyl)-reserpate,
18-epi-syrosingopine,
18-epi-rescinnamine,
methyl 18-epi-O-(O-ethoxycarbonyl-feruloyl)-reserpate,
ethyl 18-epi-O-propionyl-reserpate,
ethyl 18-epi-O-(3,4,5-trimethoxy-benzoyl)-reserpate,
ethyl 18-epi-O-(4-chloro-benzoyl)-reserpate,
ethyl 18-epi-O(3,4,5-trimethoxy-cinnamoyl)-reserpate,
n-propyl 18-epi-O-(4-methyl-benzoyl)-reserpate,
n-propyl 18-epi-O-(3,4,5-trimethoxy-benzoyl)-reserpate,
isopropyl 18-epi-O-(3,4,5-trimethoxy-benzoyl)-reserpate,
isopropyl 18-epi-O-(O-ethoxycarbonyl-vanilloyl)-reserpate,
n-butyl 18-epi-O-(3,4,5-trimethoxy-benzoyl)-reserpate,
n-butyl 18-epi-O-(3-N,N-dimethylamino-benzoyl)-reserpate,
isobutyl 18-epi-O-(3,4,5-trimethoxy-benzoyl)-reserpate, n-pentyl 18-epi-O-(3,4-dimethoxy-benzoyl)-reserpate,
n-hexyl 18-epi-O-nicotinoyl-reserpate,
methyl 18-epi-O-acetyl-9-methoxy-deserpidate,
methyl 9-methoxy-18-epi-O-(3,4,5-trimethoxy-benzoyl)-deserpidate,
methyl 18-epi-O-(O-ethoxycarbonyl-syringoyl)-9-methoxy-deserpidate,
methyl 9-methoxy-18-epi-O-n-butyroyl-deserpidate,
ethyl 9-methoxy-18-epi-O-(3,4,5-trimethoxy-benzoyl)-deserpidate,
methyl 18-epi-O-(4-acetoxy-benzoyl)-10-methoxy-deserpidate,
methyl 10-methoxy-18-epi-O-(3,4,5-trimethoxy-benzoyl)-deserpidate,
methyl 18-epi-O-isonicotinoyl-10-methoxy-deserpidate,
methyl 18-O-(2-furoyl)-10-methoxy-deserpidate,
ethyl 10-methoxy-18-epi-O-(3,4,5-trimethoxy-benzoyl)-deserpidate,
n-propyl 18-epi-O-(3,4-dichloro-benzoyl)-10-methoxy-deserpidate,
isopropyl 10-methoxy-18-epi-O-(3,4,5-trimethoxy-benzoyl)-deserpidate,
methyl 11-ethoxy-18-epi-O-cinnamoyl-deserpidate,
methyl 11-ethoxy-18-epi-O-(4-nitro-benzoyl)-deserpidate,
methyl 11-ethoxy-18-epi-O-(3,4,5-trimethoxy-benzoyl)-deserpidate,
methyl 18-epi-O-(4-ethoxy-carbonyloxy-benzoyl)-11-n-propyloxy-deserpidate,
methyl 18-epi-O-piperonyloyl-11-n-propyloxy-deserpidate,
methyl 18-epi-O-ethoxycarbonyl-11-n-propyloxy-deserpidate,
methyl 11-isopropyloxy-18-epi-O-shikimoyl-deserpidate,
methyl 11-isopropyloxy-18-epi-O-(4-methoxy-3,5-dimethyl-benzoyl)-deserpidate,
ethyl 11-isopropyloxy-18-epi-(3,4,5-trimethoxy-benzoyl)-deserpidate,
methyl 11-n-butyloxy-18-epi-O-(ethoxycarbonylamino-benzoyl)-deserpidate,
methyl 11-n-butyloxy-18-epi-O-(2-methoxy-2-phenyl-acetyl)deserpidate,
methyl 11-n-butyloxy-18-epi-O-(phenoxy-acetyl)-deserpidate,
methyl 18-epi-O-acetyl-12-methoxy-deserpidate,
methyl 12-methoxy-18-epi-O-(3,4,5-trimethoxy-benzoyl)-deserpidate,
ethyl 12-methoxy-18-epi-O-phenyl-acetyl-deserpidate,
18-epi-deserpidine,
methyl 18-epi-O-acetyl-deserpidate,
methyl 18-epi-O-(3,4,5-trimethoxy-cinnamoyl)-deserpidate,
methyl 18-epi-O-(O-ethoxycarbonyl-syringoyl)-deserpidate,
methyl 18-epi-O-(O-methoxycarbonyl-feruloyl)-deserpidate,
methyl 18-epi-O-nicotinoyl-deserpidate,
methyl 18-epi-O-(4-hydroxy-benzoyl)-deserpidate,
ethyl 18-epi-O-(3,4,5-trimethoxy-benzoyl)-deserpidate,
ethyl 18-epi-O-(4-trifluoromethyl-benzoyl)-deserpidate,
ethyl 18-epi-O-(3-nitro-benzoyl)-deserpidate,
n-propyl 18-epi-O-(4-bromo-benzoyl)-deserpidate,
n-propyl 18-epi-O-(O-ethoxycarbonyl-syringoyl)-deserpidate,
isopropyl 18-epi-O-(3,4,5-trimethoxy-cinnamoyl)-deserpidate,
isopropyl 18-epi-O-(3,4,5-trimethoxy-benzoyl)-deserpidate,
n-butyl 18-epi-O-acetyl-deserpidate,
secondary butyl 18-epi-O-(3,4,5-trimethoxy-benzoyl)-deserpidate,
n-pentyl 18-epi-O-(3-N,N-dimethylamino-benzoyl)-deserpidate,
methyl 18-epi-O-(4-ethoxycarbonyloxy-benzoyl)-5-methyl-reserpate,
methyl 5-methyl-18-epi-O-(3,4,5-trimethoxy-benzoyl)-reserpate,
methyl 5-methyl-18-epi-O-benzoyl-reserpate,
ethyl 5-methyl-18-epi-O-(3,4,5-trimethoxy-benzoyl)-reserpate,
methyl 18-epi-O-acetyl-6-methyl-reserpate,
methyl 6-methyl-18-epi-O-(3,4,5-trimethoxy-cinnamoyl)-reserpate,
methyl 18-epi-O-(4-fluoro-benzoyl)-6-methyl-deserpidate,
methyl 6-methyl-18-epi-O-(3,4,5-trimethoxy-benzoyl)-deserpidate,
ethyl 6-methyl-18-epi-O-(4-nitro-benzoyl)-deserpidate,
methyl 18-epi-O-(2,5-dibromo-benzoyl)-9-methyl-deserpidate,
methyl 9-methyl-18-epi-O-(3,4,5-trimethoxy-benzoyl)-deserpidate,
methyl 9-methyl-18-epi-O-vanilloyl-deserpidate,
n-propyl 9-methyl-18-epi-O-(3,4,5-trimethoxy-benzoyl)-deserpidate,
methyl 18-epi-O-(O-ethoxycarbonyl-syringoyl)-11-methyl-deserpidate,
methyl 11-methyl-18-epi-O-(3,4,5-trimethoxy-benzoyl)-deserpidate,
ethyl 11-methyl-18-epi-O-(3,4,5-trimethoxy-cinnamoyl)-deserpidate,
ethyl 11-methyl-18-epi-O-nicotinoyl-deserpidate,
methyl 18-epi-O-(3,4-dimethoxy-benzoyl)-10-methoxy-reserpate,
methyl 10-methoxy-18-epi-O-(3,4,5-trimethoxy-benzoyl)-reserpate,
methyl 18-epi-O-(O-ethoxycarbonyl-feruloyl)-10-methoxy-reserpate,
ethyl 10-methoxy-18-epi-O-(3-methoxy-benzoyl)-reserpate,
methyl 18-epi-O-(4-chloro-benzoyl)-10,11-lower alkylenedioxy-deserpidate,
methyl 18-epi-O-(3-N,N-dimethylamino-benzoyl)-10,11-methylenedioxy-deserpidate,
ethyl 18-epi-O-(3,4-dimethoxy-benzoyl)-10,11-methylenedioxy-deserpidate,
methyl 10-benzyloxy-18-epi-O-(3,4,5-trimethoxy-benzoyl)-deserpidate,
methyl 10-benzyloxy-18-epi-O-isonicotinoyl-deserpidate,
methyl 10-benzyloxy-18-epi-O-(4-nitro-benzoyl)-deserpidate,
ethyl 10-benzyloxy-18-epi-O-(2-methyl-benzoyl)-deserpidate,
methyl 11-benzyloxy-18-epi-O-propionyl-deserpidate,
methyl 11-benzyloxy-18-epi-O-methyl-(3,4,5-trimethoxy-benzoyl)-deserpidate,
methyl 11-benzyloxy-18-epi-O-(4-chloro-benzoyl)-deserpidate,
ethyl 11-benzyloxy-18-epi-O-(4-methoxy-benzoyl)-deserpidate,
methyl 18-epi-O-(3,4-dichloro-benzoyl)-11-methylmercapto-deserpidate,
methyl 18-epi-O-diphenylacetyl-11-methylmercapto-deserpidate,
methyl 11-methylmercapto-18-epi-O-(3,4,5-trimethoxy-benzoyl)-deserpidate,
ethyl 11-methylmercapto-18-epi-O-(4-nitro-benzoyl)-deserpidate,
methyl 11-ethylmercapto-18-epi-O-(O-methoxycarbonyl-syringoyl)-deserpidate,
methyl 11-ethylmercapto-18-epi-O-(3,4,5-trimethoxy-benzoyl)-deserpidate,
ethyl 18-epi-O-(O-ethoxycarbonyl-feruloyl)-11-ethylmercapto-deserpidate,
n-propyl 11-ethylmercapto-18-epi-O-(3,4,5-trimethoxy-cinnamoyl)-deserpidate,
methyl 10-chloro-18-epi-O-(3,4-dichloro-benzoyl)-deserpidate,
methyl 10-chloro-18-epi-O-(3-ethyl-benzoyl)-deserpidate, methyl 10-chloro-18-epi-O-(3,4,5-trimethoxy-benzoyl)-deserpidate,
ethyl 10-chloro-18-epi-O-isovaleroyl-deserpidate,
methyl 10-bromo-18-epi-O-(3,4,5-trimethoxy-benzoyl)-reserpate,
methyl 10-bromo-18-epi-O-(O-ethoxycarbonyl-benzoyl)-reserpate,
methyl 10-bromo-18-epi-O-cinnamoyl-reserprate,
ethyl 10-bromo-18-epi-O-(4-N,N-dimethylamino-benzoyl)-reserpate,
methyl 17α-desmethoxy-17α-ethoxy-18-epi-O-(3,4,5-trimethoxy-benzoyl)-reserpate,
methyl 17α-desmethoxy-17α-ethoxy-18-epi-O-(3-fluoro-benzoyl)-reserpate,
methyl 17α-desmethoxy-17α-ethoxy-18-epi-O-(O-ethoxy-carbonyl-vanilloyl)-reserpate,
methyl 17α-desmethoxy-18-epi-O-(4-methoxy-benzoyl)-17α-n-propyloxy-reserpate,
methyl 17α-desmethoxy-18-epi-O-isonicotinoyl-17α-n-propyloxy-reserpate,
ethyl 17α-desmethoxy-17α-n-propyloxy-18-epi-O-(3,4,5-trimethoxy-benzoyl)-reserpate,
methyl 17α-desmethoxy-17α-isopropyloxy-18-epi-O-(3,4,5-trimethoxy-cinnamoyl)-reserpate,
methyl 17α-desmethoxy-17α-isopropyloxy-18-epi-O-(3-methyl-benzyl)-reserpate,
methyl 17α-desmethoxy-18-epi-O-(4-ethoxycarbonyl-amino-benzoyl)-17α-isopropyloxy-reserpate,
methyl 17α-desmethoxy-17α-ethoxy-18-epi-O-(3,4,5-trimethoxy-benzoyl)-deserpidate,
methyl 17α-desemthoxy-17α-ethoxy-18-epi-O-propionyl-deserpidate,
methyl 18-epi-O-(4-acetylamino-benzoyl)-17α-desmethoxy-17α-ethoxy-18-epi-O-(3,4,5-trimethoxy-benzoyl)-deserpidate and the like, or analogous compounds, and the therapeutically acceptable acid addition salts of such compounds.

*Example 5*

A mixture of 0.8 g. of methyl 18-epi-reserpate monohydrate, 10 ml. of methanol and 5 ml. of water containing 0.5 g. of potassium hydroxide is gently heated and then taken to dryness under reduced pressure; from the residue the desired 18-epi-reserpic acid can be isolated. It can be characterized as the hydrochloride.

What is claimed is:
1. Process for the preparation of a member selected from the group consisting of a 18α-hydroxy-17α-lower alkoxy-3-epi-allo-yohimbane 16β-carboxylic acid ester, the acid addition salt, the N-oxide and the acid addition salt of the N-oxide thereof, which comprises reacting at an elevated temperature a member selected from the group consisting of an 18β-carbocyclic aryl-sulfonyloxy-17α-lower alkoxy-3-epi-allo-yohimbane 16β-carboxylic acid ester, the acid addition salt, the N-oxide, and the acid addition salt of such N-oxide thereof, with water and an organic tertiary amine selected from the group consisting of an aliphatic tertiary amine and a heterocyclic tertiary amine.
2. Process according to claim 1, which comprises using N,N,N-triethylamine as the organic tertiary amine.

References Cited in the file of this patent

UNITED STATES PATENTS

| | | |
|---|---|---|
| 2,813,871 | Lucas | Nov. 19, 1957 |
| 2,824,874 | Schlittler | Feb. 25, 1958 |
| 2,854,454 | Ulshafer | Sept. 30, 1958 |
| 2,857,386 | Huebner | Oct. 21, 1958 |
| 2,883,384 | Woodward | Apr. 21, 1959 |
| 2,926,167 | Joly et al. | Feb. 23, 1960 |

OTHER REFERENCES

Gould: Mechanism and Structure in Org. Chem., Holt Co., N.Y (1959), page 345.

Drahowzal et al.: Monatshefte für Chemie, vol. 82 (1951), pages 594–599.

Burwell et al.: Jour. Amer. Chem. Soc., vol. 70 (1948), page 878.

Burwell: Jour. Amer. Chem. Soc., vol. 74 (1952), pages 1462–1466.

Dudley et al.: Jour. Amer. Chem. Soc., vol. 73 (1951), pages 2986 and 2987.

Groggins: Unit Processes in Organic Chemistry, McGraw-Hill, New York (1952), page 656.

Klohs et al.: Jour. Amer. Chem. Soc., vol. 76 (1954), page 2843.

Karrer: Organic Chemistry, Elsevier, New York, N.Y. (1938), pages 85, 95 and 96.

Huebner et al.: Experientia, vol. 11, No. 8, (August 15, 1955), pages 303 and 304.